(12) United States Patent
Badejo et al.

(10) Patent No.: US 8,153,743 B2
(45) Date of Patent: Apr. 10, 2012

(54) CONTROLLED EXOTHERM OF CYANOACRYLATE FORMULATIONS

(75) Inventors: Ibraheem T. Badejo, Raleigh, NC (US); Andres Rivera, Wake Forest, NC (US); Melanie Vander Klok, Raleigh, NC (US)

(73) Assignee: Closure Medical Corporation, Raleigh, NC (US)

( * ) Notice: Subject to any disclaimer, the term of this patent is extended or adjusted under 35 U.S.C. 154(b) by 904 days.

(21) Appl. No.: 12/183,295

(22) Filed: Jul. 31, 2008

(65) Prior Publication Data

US 2010/0030258 A1    Feb. 4, 2010

(51) Int. Cl.
*C09J 4/04* (2006.01)
*C08K 5/19* (2006.01)
*C08K 5/315* (2006.01)

(52) U.S. Cl. ......... 526/310; 526/209; 526/211; 606/214
(58) Field of Classification Search ................ 526/310, 526/209, 211; 606/214
See application file for complete search history.

(56) References Cited

U.S. PATENT DOCUMENTS

| | | | |
|---|---|---|---|
| 2,721,858 A | 10/1955 | Joyner et al. | |
| 3,254,111 A | 5/1966 | Hawkins et al. | |
| 3,940,362 A | 2/1976 | Overhults | |
| 3,995,641 A | 12/1976 | Kronenthal et al. | |
| 4,200,549 A * | 4/1980 | Okamura et al. | 524/722 |
| 4,313,865 A | 2/1982 | Teramoto et al. | |
| 4,364,876 A | 12/1982 | Kimura et al. | |
| 4,560,723 A | 12/1985 | Millet et al. | |
| 4,720,513 A | 1/1988 | Kameyama et al. | |
| 5,328,687 A | 7/1994 | Leung et al. | |
| 5,575,997 A | 11/1996 | Leung et al. | |
| 5,582,834 A | 12/1996 | Leung et al. | |
| 5,624,669 A | 4/1997 | Leung et al. | |
| 5,814,022 A | 9/1998 | Antanavich et al. | |
| 5,928,611 A | 7/1999 | Leung | |
| 5,935,437 A | 8/1999 | Whitmore | |
| 6,010,714 A | 1/2000 | Leung et al. | |
| 6,579,469 B1 | 6/2003 | Nicholson et al. | |
| 6,620,846 B1 | 9/2003 | Jonn et al. | |
| 7,138,441 B1 * | 11/2006 | Zhang | 523/113 |
| 2002/0018689 A1 * | 2/2002 | Badejo et al. | 401/132 |
| 2002/0037310 A1 | 3/2002 | Jonn et al. | |
| 2003/0039781 A1 | 2/2003 | D'Alessio et al. | |

FOREIGN PATENT DOCUMENTS

WO  WO 02/09785  2/2002

OTHER PUBLICATIONS

"Nutraceuticals"; prepared by: North Carolina Association for Biomedical Research; published by aboutbioscience.org; pp. 1-10; Jul. 2007.

* cited by examiner

*Primary Examiner* — Ling Choi
*Assistant Examiner* — Chun-Cheng Wang

(57) ABSTRACT

An adhesive composition includes one or more polymerizable cyanoacrylate monomers, a polymerization initiator and a polymerization accelerator for the one or more polymerizable cyanoacrylate monomers. A system for treating living tissue includes a first reservoir containing one or more polymerizable cyanoacrylate monomers, a second reservoir in a non-contacting relationship with the first reservoir containing a polymerization initiator and accelerator for the one or more polymerizable cyanoacrylate monomers, and an applicator capable of combining the polymerizable cyanoacrylate monomer and the polymerization initiator and accelerator to form an adhesive composition and then applying the adhesive composition to living tissue. The initiator may be a quaternary ammonium salt, and the accelerator may be a trihydroxy tertiary amine.

10 Claims, 9 Drawing Sheets

CONTROLLED EXOTHERM OF CYANOACRYLATE FORMULATIONS

FIELD OF THE INVENTION

The invention relates to stabilized monomer and absorbable polymer adhesive and sealant compositions, and to their use for industrial and medical applications.

BACKGROUND

Monomer and polymer adhesives/sealants are used in both industrial (including household) and medical/surgical applications. Included among these adhesives or sealants are cyanoacrylate monomers and polymers resulting therefrom. Since the discovery of the adhesive/sealant properties of such monomers and polymers, they have found wide use due to the speed with which they cure, the strength of the resulting bond formed, and their relative ease of use. These characteristics have made cyanoacrylate compositions the primary choice for numerous adhesive applications such as bonding plastics, rubbers, glass, metals, wood, and, more recently, medical, biological or living tissues.

Medical and surgical applications of cyanoacrylate compositions include their use as alternates or adjuncts to surgical sutures, meshes and staples or other medical devices in wound closure, as well as for covering and protecting surface wounds such as lacerations, abrasions, burns, stomatitises (plural of stomatitis), sores, and other surface wounds. When a cyanoacrylate composition is applied, it is usually applied in its monomeric form, and the resultant polymer creates the desired adhesive bond or sealant strength.

During the cyanoacrylate adhesive polymerization process, an exothermic reaction occurs that increases the temperature of the composition. Depending on the monomer utilized in the composition and the additives used, the temperature increase varies. In particular, as the viscosity of the adhesive increases, the ability to apply a thicker layer of material in a single application is present. This application creates the potential for a higher exotherm than if applying a less viscous composition using multiple layers to create an application of the same thickness. In addition, for some applications, is desirable to use a more viscous adhesive in order to prevent the adhesive from running when applied to a surface and spreading into a wound or along a surface to an area that does not require adhesive.

The increase in temperature of the adhesive composition due to exothermic polymerization of the monomeric component may be as low as 5° C. and as high as 70° C., depending on the composition of the adhesive. A temperature increase of as little as 45° C. of the adhesive composition placed on the surface of living tissue will generally cause discomfort. It is widely believed that temperatures above 60° C. generally cause tissue damage.

As disclosed in U.S. Pat. No. 6,010,714 (the "'714 patent"), which is hereby incorporated by reference herein, it is known to add a heat dissipating agent to a cyanoacrylate adhesive in order to reduce the amount of heat generated upon polymerization of the monomer. The '714 patent discloses adding heat dissipating agents such as ethers, ketones, chlorofluorocarbons, alkanes, alchohols, alkenes and mixtures thereof. The heat dissipating agents disclosed in the '714 patent are useful for adhesive compositions having relatively low viscosities, e.g. 40-50 cp. There remains a need for a relatively thicker surgical adhesive that does not cause thermal damage or necrosis of living tissue after application of the adhesive to the tissue. Therefore, there is a need for an additive or a combination of additives that will reduce the amount of heat released or exotherm generated during the polymerization of a cyanoacrylate monomer.

SUMMARY

An adhesive composition is provided comprising one or more polymerizable cyanoacrylate monomers, a polymerization initiator and a polymerization accelerator for the one or more polymerizable cyanoacrylate monomers. The polymerization initiator includes a quaternary ammonium salt. The polymerization accelerator includes a trihydroxy tertiary amine.

The adhesive composition may further comprise one or more of stabilizing agents, preservatives, heat dissipating agents, colorant, or combinations thereof. The quaternary ammonium salt may be benzalkonium chloride. The trihydroxy tertiary amine may be triisopropanolamine or poly (5) oxyethylene isotridecyloxypropyl amine.

In an embodiment, a system for treating living tissue is provided comprising a first reservoir containing one or more polymerizable cyanoacrylate monomers, a second reservoir in a non-contacting relationship with the first reservoir containing a polymerization initiator and accelerator for the one or more polymerizable cyanoacrylate monomers, and an applicator capable of combining the polymerizable cyanoacrylate monomer and the polymerization initiator and accelerator to form an adhesive composition and then applying the adhesive composition to living tissue. The polymerization accelerator may comprise a trihydroxy tertiary amine. The polymerization initiator may comprise a quaternary ammonium salt.

In another embodiment, a method of treating living tissue is provided comprising applying to living tissue a biocompatible adhesive composition comprising one or more polymerizable cyanoacrylate monomers, a polymerization initiator for the one or more polymerizable cyanoacrylate monomers comprising a quaternary ammonium salt, and a polymerization accelerator for the one or more polymerizable cyanoacrylate monomers comprising a trihydroxy tertiary amine.

DETAILED DESCRIPTION

Figure 1:
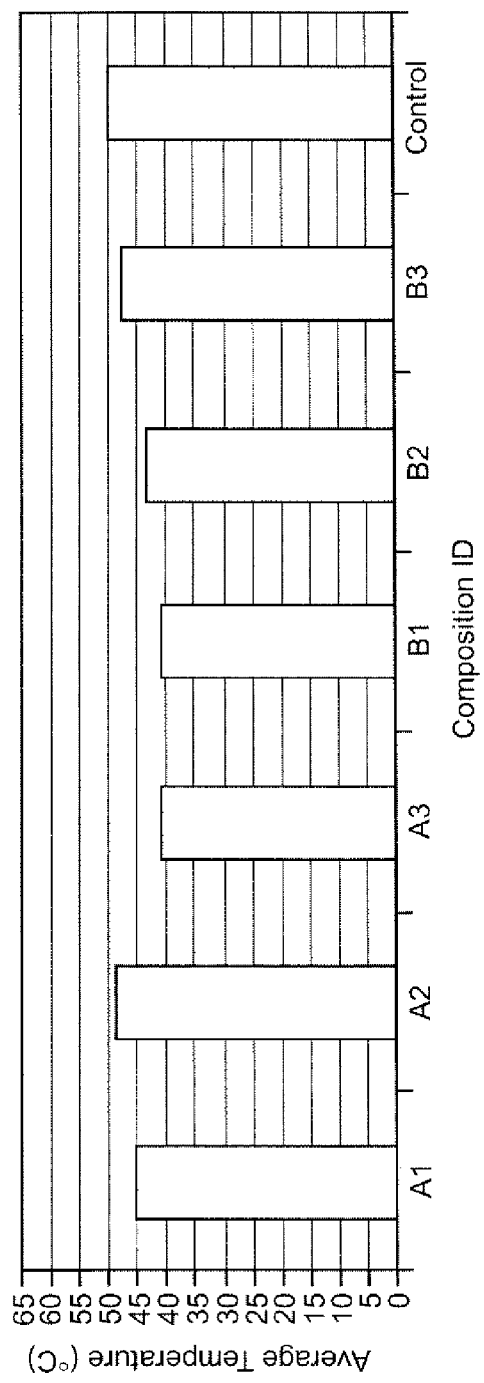
FIG. 1 is a chart depicting the Average Temperature for Benzalkonium Chloride System with Compositions A (3 Lots) and B (3 Lots): 110 µg compared to Control Composition with 40 µg Benzalkonium Chloride.

For the purposes of this invention, the term "absorbable" or variations thereof means capable of being absorbed, degraded or biodegraded, either fully or partially, by animal (including human) tissue after application of the adhesive or sealant. Also, the term "substantially absorbed" means at least 90% absorbed. The term "non-absorbable" or variations thereof means completely or substantially incapable of being absorbed, either fully or partially, by animal tissue after application of the adhesive or sealant.

The term "effective amount" is an amount sufficient to provide desired properties to the adhesive compositions. The effective amount may be affected by cyanoacrylate monomers, viscosity modifying agents, stabilizers, initiators or other ingredients used to form the adhesive composition.

The term "stability" or "stabilized" as used herein may be determined by measuring the viscosity of the cyanoacrylate composition over a period of time. Premature polymerization of the cyanoacrylate composition results in an increase in viscosity over time; therefore, viscosity of a composition may be used to determine composition stability.

The term "biocompatible" refers to a material being suited for and meeting the requirements of a medical device, used for either long or short term implants or for non-implantable applications, such that when implanted or applied in an intended location, the material serves the intended function for the required amount of time without causing an unacceptable response. Long-term implants are defined as items implanted for more than 30 days.

A cyanoacrylate adhesive composition comprising one or more polymerizable cyanoacrylate monomer is provided. Controlled exotherm of the monomeric cyanoacrylate adhesive composition is achieved through the addition of an initiator composition comprising an initiator such as a quaternary ammonium salt and an accelerator such as a trihydroxy tertiary amine to a polymerizable monomeric cyanoacrylate composition resulting in a cyanoacrylate adhesive composition. The initiator composition enables the reduction of exotherm upon polymerization of the cyanoacrylate monomer. It is also contemplated that an accelerator alone may be added to the monomeric cyanoacrylate in order to control exotherm upon polymerization.

A suitable quaternary ammonium salt may serve as the initiator and may have a cure rate of as short a time as a few seconds to a few minutes. The cure rate may be closely controlled by the selection of an amount or concentration of quaternary ammonium salt to be added to the composition and may thus be readily controlled by one skilled in the art in light of the present disclosure. A suitable quaternary ammonium salt provides consistent, controllable, and complete polymerization of the monomer or monomers so that the polymerization of the monomer or monomers can be made to occur in the time desired for the particular application.

The quaternary ammonium salt may be any of a group of ammonium salts in which organic radicals have been substituted for all four hydrogens of the original ammonium cation. In embodiments, the quaternary ammonium salt may have the general formula A:

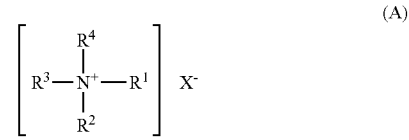

(A)

wherein $R^1$, $R^2$, $R^3$ and $R^4$ are each, independently, a substituted or unsubstituted straight, branched or cyclic alkyl group; a substituted or unsubstituted aromatic ring; or a substituted or unsubstituted aralkyl group, wherein the alkyl groups, aromatic rings or aralkyl groups may optionally further contain heteroatoms such as O, N, and S; and X is an anion such as a halide, for example chloride, bromide, or fluoride, or hydroxyl. In embodiments, $R^1$, $R^2$, $R^3$ and $R^4$ are $C_1$-$C_8$ alkyl groups, preferably, $C_1$-$C_4$ alkyl groups, or an aralkyl group. By way of example, quaternary ammonium salts may include, but are not limited to, tetrabutylammonium fluoride, tetramethylammonium fluoride, tetraethylammonium fluoride, tetraoctylammonium fluoride, benzyltrimethyl ammonium fluoride, domiphen bromide, butyrylcholine chloride, benzalkonium bromide, benzalkonium chloride, acetyl choline chloride, or a combination thereof. It is preferred that the initiator be benzalkonium chloride (BAC).

The amount of quaternary ammonium salt added to the polymerizable cyanoacrylate monomer typically may depend on the cyanoacrylate monomer(s), the accelerator, the viscosity modifying agent, the stabilizers, and the desired rate of polymerization. Typically, the quaternary ammonium salt will be present in an amount of from about 10 ppm to about 10,000 ppm, preferably about 200 ppm to about 6000 ppm. When applied to the medical device, the concentrations will be present in an amount of from about 10 μg to about 500 μg, preferably about 15 μg to about 300 μg.

A suitable trihydroxy tertiary amine may serve as the accelerator. Similarly to the initiator, a suitable trihydroxy tertiary amine provides consistent, controllable, and complete polymerization of the monomer or monomers so that the polymerization of the monomer or monomers can be made to occur in the time desired for the particular application. In addition, the combined usage of a quaternary ammonium salt and a trihydroxy tertiary amine reduces the amount of heat released upon polymerization of the cyanoacrylate monomer.

In embodiments, a trihydroxy tertiary amine may have the generic formula B:

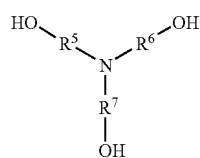

wherein $R^5$, $R^6$, and $R^7$ are each, independently, a C1-C20 substituted or unsubstituted straight, branched or cyclic alkyl, or aryl group. It is preferred that the trihydroxy tertiary amine be a nitrilotris having three identical —ROH groups around a central nitrogen. By way of example, trihydroxy tertiary amines may include, but are not limited to triethanolamine, triisopropanolamine (TIPA), tris(sec-butanolamine), 3, 3',3"-Nitrilotris-(1,2-propanediol), and 5,5',5"-Nitrilotris-(1-pentanol). It is preferred that the initiator be TIPA.

A trihydroxy tertiary amine may also have the generic formula C:

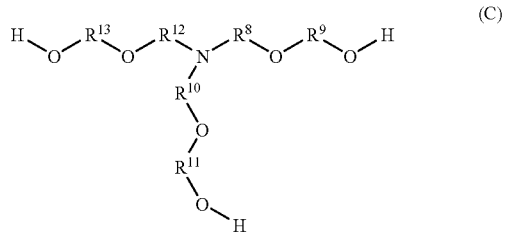

wherein $R^8$, $R^9$, $R^{10}$, $R^{11}$, $R^{12}$, $R^{13}$ are each, independently a C1-C20 alkylene, substituted alkylene, cyclic or substituted cycloalkylene, or aryl group. It is preferred that the trihydroxy tertiary amine is a nitrilotris having three identical —ROROH groups around a central nitrogen. By way of example, trihydroxy tertiary amines may include, but are not limited to ethoxylated or propoxylated nitrilotri. It is preferred that the trihydroxy tertiary amine is poly (5) oxyethylene isotridecyloxypropyl amine (E-17-5).

The amount of trihydroxy tertiary amine added to the polymerizable cyanoacrylate monomer typically may depend on the cyanoacrylate monomer(s), the initiator, the viscosity modifying agent, the stabilizers, and the desired rate of polymerization. Typically, the trihydroxy tertiary amine will be present in an amount of from about 10 ppm to about 10,000 ppm, preferably about 500 ppm to about 20,000 ppm. When applied to the medical device, the concentration will be present in an amount of from about 100 μg to about 10,000 μg, preferably about 500 μg to 2500 μg.

Cyanoacrylate adhesive monomer compositions including the initiators and accelerators as described, and polymers formed therefrom, are useful as tissue adhesives, sealants for preventing bleeding or for covering open wounds, and in other biomedical applications. The adhesive compositions find uses in, for example, preventing body fluid leakage, sealing air leakage in the body, tissue approximation, apposing surgically incised or traumatically lacerated tissues; retarding blood flow from wounds; drug delivery; dressing burns; dressing skin or other superficial or deep tissue surface wounds (such as abrasions, chaffed or raw skin, and/or stomatitis); and aiding repair and regrowth of living tissue. Adhesive compositions of the present invention have broad application for sealing wounds in various living tissue, internal organs and blood vessels, and can be applied, for example, on the interior or exterior of blood vessels and various organs or tissues. Adhesive compositions of the present invention are also useful in industrial and home applications, for example in bonding rubbers, plastics, wood, composites, fabrics, and other natural and synthetic materials.

Monomers that may be used in this invention are readily polymerizable, e.g. anionically polymerizable or free radical polymerizable, or polymerizable by zwitterions or ion pairs to form polymers. Some such monomers are disclosed in, for example, U.S. Pat. No. 5,328,687 to Leung, et al., which is hereby incorporated by reference in its entirety herein. Preferably, the cyanoacrylate adhesive compositions comprise one or more polymerizable cyanoacrylate monomers and are biocompatible. The cyanoacrylate adhesive compositions comprising one or more polymerizable cyanoacrylate monomers may include combinations or mixtures of cyanoacrylate monomers.

Preferably, the adhesive composition comprises one or more polymerizable cyanoacrylate monomers and may include combinations or mixtures of cyanoacrylate monomers of formula (I). The cyanoacrylates monomers are known in the art and have the formula

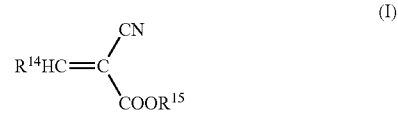

wherein $R^{14}$ is hydrogen and $R^{15}$ is a hydrocarbyl or substituted hydrocarbyl group; a group having the formula —$R^{16}$—O—$R^{17}$—O—$R^{18}$, wherein $R^{16}$ is a 1,2-alkylene group having 2-4 carbon atoms, $R^{17}$ is an alkylene group having 1-4 carbon atoms, and $R^{18}$ is an alkyl group having 1-6 carbon atoms; or a group having the formula

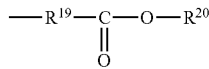

wherein $R^{19}$ is

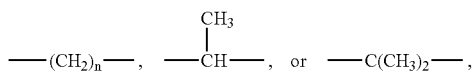

wherein n is 1-10, preferably 1-5 carbon atoms, and $R^{20}$ is an organic moiety. The organic moiety $R^{20}$ may be substituted or unsubstituted and may be straight chain, branched or cyclic, saturated, unsaturated or aromatic. Preferred organic radicals are alkyl, alkenyl, and alkynyl moieties having from 1 to about 8 carbon atoms, and halo-substituted derivatives thereof. Particularly preferred are alkyl moieties of 4 to 6 carbon atoms.

In the cyanoacrylate monomer of formula (I), $R^{15}$ may be an alkyl group having 1-10 carbon atoms or a group having the formula -$AOR^{21}$, wherein A is a divalent straight or branched chain alkylene or oxyalkylene moiety having 2-8 carbon atoms, and $R^{21}$ is a straight or branched alkyl moiety having 1-8 carbon atoms. Examples of groups represented by the formula -$AOR^{21}$ include 1-methoxy-2-propyl, 2-butoxy ethyl, isopropoxy ethyl, 2-methoxy ethyl, and 2-ethoxy ethyl.

The cyanoacrylates of formula (I) can be prepared according to methods known in the art. For example, cyanoacrylates can be prepared by reacting an alkyl cyanoacetate with formaldehyde in a nonaqueous organic solvent and in the presence of a basic catalyst, followed by pyrolysis of the anhydrous intermediate polymer in the presence of a polymerization inhibitor as disclosed in U.S. Pat. Nos. 2,721,858 and 3,254,111. The cyanoacrylates of formula (I) wherein $R^{15}$ is a group having the formula $R^{16}$—O—$R^{17}$—O—$R^{18}$ can be prepared according to the method disclosed in U.S. Pat. No. 4,364,876, and the cyanoacrylates of formula (I) wherein $R^{15}$ is a group having the formula

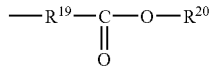

can be prepared according to the method described in U.S. Pat. No. 3,995,641. Each of the above listed patents is hereby incorporated by reference in its entirety.

Suitable cyanoacrylate monomers may be used, alone or in combination, and may include, but not be limited to, 2-octyl cyanoacrylate; dodecyl cyanoacrylate; 2-ethylhexyl cyanoacrylate; butyl cyanoacrylate such as n-butyl cyanoacrylate; ethyl cyanoacrylate; methyl cyanoacrylate; methoxyethyl cyanoacrylate; 2-ethoxyethyl cyanoacrylate; 3-methoxybutyl cyanoacrylate; 2-butoxyethyl cyanoacrylate; 2-isopropoxyethyl cyanoacrylate; and 1-methoxy-2-propyl cyanoacrylate. In embodiments, the monomers may be ethyl, n-butyl, or 2-octyl α-cyanoacrylate.

The cyanoacrylate monomers which may be used in the adhesive/sealant compositions may include alkyl ester cyanoacrylates. The alkyl ester cyanoacrylate monomers may have the formula:

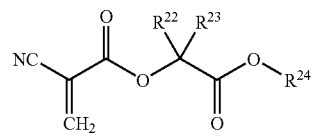

wherein $R^{22}$ and $R^{23}$ are, independently, H, a straight, branched or cyclic alkyl, or are combined together in a cyclic alkyl group, $R^{24}$ is a straight, branched or cyclic alkyl group, and m is 1-8. Preferably, $R^{22}$ is H or a $C_1$, $C_2$ or $C_3$ alkyl group, such as methyl or ethyl; $R^{23}$ is H or a $C_1$, $C_2$ or $C_3$ alkyl group, such as methyl or ethyl; $R^{24}$ is a $C_1$-$C_{16}$ alkyl group, more preferably a $C_1$-$C_{10}$ alkyl group, such as methyl, ethyl, propyl, isopropyl, butyl, isobutyl, pentyl, hexyl, heptyl, octyl, nonyl or decyl, and even more preferably a $C_2$, $C_3$ or $C_4$ alkyl group, and m is preferably 1-4.

Examples of alkyl ester cyanoacrylates include, but are not limited to, butyl lactoyl cyanoacrylate (BLCA), butyl glycoloyl cyanoacrylate (BGCA), isopropyl glycoloyl cyanoacrylate (IPGCA), ethyl lactoyl cyanoacrylate (ELCA), and ethyl glycoloyl cyanoacrylate (EGCA), isopropylethylcyanoacrylate (IPECA) and combinations thereof. BLCA may be represented by the formula above, wherein $R^{22}$ is H, $R^{23}$ is methyl and $R^{24}$ is butyl. BGCA may be represented by the formula above, wherein $R^{22}$ is H, $R^{23}$ is H and $R^{24}$ is butyl. IPGCA may be represented by the formula above, wherein $R^{22}$ is H, $R^{23}$ is H and $R^{24}$ is isopropyl. ELCA may be represented by the formula above, wherein $R^{22}$ is H, $R^{23}$ is methyl and $R^{24}$ is ethyl. EGCA may be represented by the formula above, wherein $R^{22}$ is H, $R^{23}$ is H and $R^{24}$ is ethyl.

Other examples of alkyl ester cyanoacrylates include 3-(2-Cyano-acryloyloxy)-butyric acid ethyl ester (Et-β-HBT-CA), 3-(2-cyano-acryloyloxy)-hexanoic acid ethyl ester (Et-β-CPL-CA), alkyl alpha-cyanoacryloyl caprolactate and alkyl alpha-cyanoacryloyl butrylactate.

The alkyl ester cyanoacrylate monomers may be prepared through the Knoevenagel reaction of an alkyl cyanoacetate, or an alkyl ester cyanoacetate, with paraformaldehyde as disclosed in U.S. Pat. No. 3,995,641. This leads to a cyanoacrylate oligomer. Subsequent thermal cracking of the oligomer results in the formation of a cyanoacrylate monomer. After further distillation, a cyanoacrylate monomer with high purity (greater than 95.0%, preferably greater than 99.0%, and more preferably greater than 99.8%) may be obtained. Monomers prepared with low moisture content and essentially free of impurities (e.g., surgical grade) are preferred for biomedical use.

An alternative or additional cyanoacrylate which may be used in the adhesive/sealant compositions includes alkyl ether cyanoacrylate. Alkyl ether cyanoacrylates have the general formula:

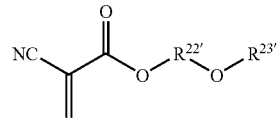

wherein $R^{22'}$ is a straight, branched or cyclic alkyl, and $R^{23'}$ is a straight, branched or cyclic alkyl group. Preferably, $R^{22'}$ is a $C_1$, $C_2$ or $C_3$ alkyl group, such as methyl or ethyl; and $R^{23'}$ is a $C_1$-$C_{16}$ alkyl group, more preferably a $C_1$-$C_{10}$ alkyl group, such as methyl, ethyl, propyl, isopropyl, butyl, isobutyl, pentyl, hexyl, heptyl, octyl, nonyl or decyl, and even more preferably a $C_2$, $C_3$ or $C_4$ alkyl group.

Examples of alkyl ether cyanoacrylates include, but are not limited to, isopropyoxy ethyl cyanoacrylate (IPECA) and methoxy butyl cyanoacrylate (MBCA) or combinations thereof. IPECA may be represented by the formula above, wherein $R^{22'}$ is ethylene and $R^{23}$ is isopropyl. MBCA may be represented by the formula above, wherein $R^{22'}$ is n-butylene and $R^{23'}$ is methyl.

Alkyl ester cyanoacrylates and alkyl ether cyanoacrylates are particularly useful for medical applications because of their absorbability by living tissue and associated fluids. It is desirable that 100% of the polymerized and applied cyanoacrylate adhesive be absorbed in a period of less than 3 years, preferably approximately 1-24 months, more preferably 1-18 months, and most preferably 3-12 months after application of the adhesive to living tissue. The absorption time may vary depending on the particular uses and tissues involved. It may be desirable for the absorption time to be longer for some types of tissue and to be shorter for other tissue types. For example, a longer absorption time may be desired when the adhesive composition is applied to hard tissues, such as bone, but a shorter absorption time may be desired when the adhesive composition is applied to softer tissues.

The selection of monomer will affect the absorption rate of the resultant polymer, as well as the polymerization rate of the monomer. Thus, two or more different monomers having varied absorption and/or polymerization rates may be used in combination to give a greater degree of control over the absorption rate of the resultant polymer, as well as the polymerization rate of the monomer. The adhesive composition may comprise a mixture of monomer species with varying absorption rates. Where two monomer species having different absorption rates are used, it is preferred that the absorption rates be sufficiently different that a mixture of the two monomers can yield a third absorption rate that is effectively different from the absorption rates of the two monomers individually. Compositions according to these embodiments are described, for example, in U.S. Patent Publication No. 2002/0037310 and U.S. Pat. No. 6,620,846, both incorporated herein by reference in their entireties.

Suitable monomer compositions may be prepared by mixing suitable quantities of an alkyl α-cyanoacrylate such as 2-octyl α-cyanoacrylate with one of butyl lactoyl cyanoacrylate (BLCA), butyl glycoloyl cyanoacrylate (BGCA), isopropyl glycoloyl cyanoacrylate (IPGCA), ethyl lactoyl cyanoacrylate (ELCA), or ethyl glycoloyl cyanoacrylate (EGCA). Such mixtures may range from ratios of about 90:10 to about 10:90 by weight, preferably about 75:25 to about 25:75 by weight.

A stabilizer or stabilizing agent may be added to the composition to prevent premature polymerization or to increase the shelf life of the cyanoacrylate monomeric composition. Suitable free radical stabilizing agents for use in monomeric cyanoacrylate compositions include, but are not limited to, hydroquinone, hydroquinone monomethyl ether, catechol, pyrogallol, benzoquinone, 2-hydroxybenzoquinone, p-methoxy phenol, t-butyl catechol, butylated hydroxy anisole, butylated hydroxy toluene, and t-butyl hydroquinone and mixtures or combinations thereof. The free radical stabilizing agents may be used in amounts from about 5 to about 10,000 ppm. In exemplary embodiments, if hydroquinone is used, the amount may be from about 5 to about 2000 ppm and may be used in conjunction with butylated hydroxy anisole in an amount of about 500 to about 10,000 ppm.

The cyanoacrylate adhesive compositions may also optionally include at least one anionic vapor phase stabilizer and at least one anionic liquid phase stabilizer. Examples of such anionic agents are described for example, in U.S. Pat. No. 6,620,846, incorporated herein by reference in its entirety.

The anionic vapor phase stabilizers may be selected from among known stabilizers, including, but not limited to, sulfur dioxide, boron trifluoride, or hydrogen fluoride. Typically, each anionic vapor phase stabilizer is added in such an amount to give a concentration of less than about 200 parts per million (ppm). In exemplary embodiments, each anionic vapor phase stabilizer is present in an amount from about 1 to about 200 ppm, preferably from about 3 to about 75 ppm, even more preferably from about 3 to about 50 ppm, and most preferably from about 3 to about 20 ppm.

The liquid phase anionic stabilizer is a very strong acid that has an aqueous $pK_a$ of less than 1.0. Examples of such very strong acids include, but are not limited to, sulfuric acid ($pK_a$–3.0), perchloric acid ($pK_a$–5), hydrochloric acid ($pK_a$–7.0), hydrobromic acid ($pK_a$–9), fluorosulfonic acid ($pK_a$<–10), and chlorosulfonic acid ($pK_a$–10). In embodiments, the very strong acid liquid phase anionic stabilizer is added in an amount to give a final concentration of about 1 to about 200 ppm. The very strong acid liquid phase anionic stabilizer may be present in a concentration of from about 5 to about 80 ppm, preferably from about 5 to about 40 ppm. For example, the very strong acid liquid phase anionic stabilizer may be sulfuric acid or chlorosulfonic acid.

The adhesive composition may optionally include at least one secondary anionic active agent. The secondary anionic active agents may be included in the adhesive compositions to more precisely control the cure speed and stability of the adhesive as well as the molecular weight of the cured adhesive. The secondary anionic active agent would typically be an acid with a higher $pK_a$ ranging from 2 to 8, preferably from 2 to 6, and most preferably from 2 to 5. Examples of such suitable secondary anionic active agents include, but are not limited to, phosphoric acid ($pK_a$ 2.2), organic acids, such as acetic acid ($pK_a$ 4.8), benzoic acid ($pK_a$ 4.2), chloroacetic acid ($pK_a$ 2.9), cyanoacetic acid, and mixtures thereof. For example, an amount of acetic acid and/or benzoic acid may be about 25 to about 500 ppm. For acetic acid, the concentration may typically be about 50 to about 400 ppm, preferably about 75 to about 300 ppm, and more preferably about 100 to about 200 ppm.

Any mixture of stabilizers and/or secondary anionic active agents may be included in the adhesive composition as long as the mixture does not significantly inhibit the desired polymerization rate of the composition. It is generally desirable for the polymerization rate of a composition to be in a range of about thirty seconds to about five minutes. Therefore, a mixture of stabilizers and/or secondary anionic active agents that inhibit polymerization such that the polymerization rate is outside of the preferred rate window may be undesirable. Furthermore, the mixture should not, in medical adhesive compositions, show unacceptable levels of toxicity. One of ordinary skill in the art will know the levels of toxicity that are acceptable for medical uses. Thus, the amount of stabilizers and/or anionic active agents to be used can be determined by one of ordinary skill in the art without undue experimentation.

The stabilizers and secondary anionic active agents are chosen such that they are compatible with the chosen adhesive composition including the cyanoacrylate monomers, boron trifluoride and other stabilizers, as well as with the packaging material and the equipment used to make and package the composition. Hence, a suitable combination should be a viscous, stabilized and substantially unpolymerized adhesive composition after packaging and sterilization.

The addition of these stabilizing agents to the cyanoacrylate monomer compositions may affect cure or polymerization rate of the compositions. To overcome the slow polymerization, a compatible agent which promotes initiation or acceleration of polymerization of a cyanoacrylate monomer or a mixture of cyanoacrylate monomers may be used with the monomer composition. For some medical applications, initiators or rate modifying agents providing a faster cure rate while maintaining the absorbability of the monomer composition are preferred.

Quaternary ammonium salt initiators have been discussed in detail above. In addition, other initiator or rate modifying agents may be used in combination with the quaternary ammonium salt. Suitable additional initiators are known in the art and are described, for example, in U.S. Pat. Nos. 5,928,611, 6,620,846, and U.S. Patent Publication No. 2002/0037310, all incorporated herein by reference in its entirety.

In exemplary embodiments, quaternary ammonium chloride and bromide salts as polymerization initiators are preferred. By way of example, quaternary ammonium salts such as domiphen bromide, butyrylcholine chloride, benzalkonium bromide, benzalkonium chloride, acetyl choline chloride, among others, may be used. When the benzalkonium halide is used, it may be benzalkonium halide in its unpurified state, which comprises a mixture of varying chain-length compounds, or it may be any suitable purified compound including those having a chain length of from about 12 to about 18 carbon atoms, including but not limited to $C_{12}$, $C_{13}$, $C_{14}$, $C_{15}$, $C_{16}$, $C_{17}$, and $C_{18}$ compounds.

Other initiators or rate modifying agents may also be selected by one of ordinary skill in the art without undue experimentation. Such suitable initiators or rate modifying agents may include, but are not limited to, detergent compositions; surfactants: e.g., nonionic surfactants such as polysorbate 20 (e.g., Tween 20™ from ICI Americas), polysorbate 80 (e.g., Tween 80™ from ICI Americas) and poloxamers, cationic surfactants such as tetrabutylammonium bromide, anionic surfactants such as sodium tetradecyl sulfate, and amphoteric or zwitterionic surfactants such as dodecyldimethyl(3-sulfopropyl)ammonium hydroxide, inner salt; amines, imines and amides, such as imidazole, arginine and povidine; phosphines, phosphites and phosphonium salts, such as triphenylphosphine and triethyl phosphite; alcohols such as ethylene glycol, methyl gallate; tannins; inorganic bases and salts, such as sodium bisulfite, calcium sulfate and sodium silicate; sulfur compounds such as thiourea and polysulfides; polymeric cyclic ethers such as monensin, nonactin, crown ethers, calixarenes and polymeric-epoxides; cyclic and acyclic carbonates, such as diethyl carbonate; phase transfer catalysts such as Aliquat 336; organometallics such as cobalt naphthenate and manganese acetylacetonate; radical initiators or accelerators, such as di-t-butyl peroxide and azobisisobutyronitrile; and a catalytic amount of an amine activated free radical initiator, accelerator, or rate modifier.

Mixtures of two or more initiators or rate modifying agents may be used with at least one quaternary ammonium fluoride salt and/or at least one quaternary ammonium ether salt. A combination of multiple initiators or rate modifying agents may be beneficial in order to tailor the initiator of the polymerizable monomer species. For example, when a mixture of monomers is used, a mixture of initiators may provide superior results in comparison to a single initiator. Also a mixture of initiators may provide one initiator that preferentially initiates one monomer, and a second initiator that preferentially initiates the other monomer, or may provide initiation rates to help ensure that both monomer species are initiated at equivalent, or desired non-equivalent, rates. In this manner, a mixture of initiators may advantageously minimize the amount of initiator to be used. Furthermore, a mixture of initiators may advantageously enhance the polymerization reaction kinetics.

The initiator or rate modifying agent may be in the form of a solid, such as a powder or a solid film, or in the form of a liquid, such as a viscous or paste-like material. The initiator or rate modifying agent may also include a variety of additives, such as surfactants or emulsifiers. Preferably, the initiator or accelerator is soluble in the monomer composition, and/or comprises or is accompanied by at least one surfactant which, in embodiments, helps the initiator or accelerator co-elute with the monomer composition. In embodiments, the surfactant may help disperse the initiator or accelerator in the monomer composition.

The initiator or rate modifying agent may be applied to the tissue or surface being treated before the monomer composition, or may be applied directly to the monomer composition when the composition is applied to the tissue. The initiator or rate modifying agent, when present, may be combined with the monomer composition just prior to applying the composition to tissue.

The selection of an initiator or rate modifying agent, when used, may additionally affect the rate at which the polymerized monomer is absorbed by living tissue. Therefore, for some medical applications, the most suitable initiators or rate modifying agents are those that initiate or accelerate polymerization of the monomer at a rate suitable for medical applications while providing a polymer that is substantially absorbed in less than three years. For purposes herein, the phrase "suitable for medical application(s)" means that the polymerization of the monomer occurs in less than 5 minutes or less than 3 minutes, preferably in less than 2.5 minutes, more preferably in less than 1 minute, and often in less than 45 seconds. The desired polymerization time may vary for different compositions and/or applications.

Other optional components may be present in the polymerizable cyanoacrylate compositions including, but not limited to, preservatives, heat dissipating agents, plasticizers, viscosity modifying agents, thixotropic agents, and colorants, which are described herein. Typically, these components will be used in amounts of up to about 25 weight %, more preferably up to about 10 weight %, and most preferably, up to about 5 weight %, based on a total weight of the composition.

The preservative may be selected from among preservatives including, but not limited to, parabens and cresols. For example, suitable parabens include, but are not limited to, alkyl parabens and salts thereof, such as methylparaben, methylparaben sodium, ethylparaben, propylparaben, propylparaben sodium, butylparaben, and the like. Suitable cresols include, but are not limited to, cresol, chlorocresol, and the like. The preservative may also be selected from other known agents including, but not limited to, hydroquinone, pyrocatechol, resorcinol, 4-n-hexyl resorcinol, captan (i.e., 3a,4,7, 7a-tetrahydro-2-((trichloromethyl)thio)-1H-isoindole-1,3 (2H)-dione), benzoic acid, benzyl alcohol, chlorobutanol, dehydroacetic acid, o-phenylphenol, phenol, phenylethyl alcohol, potassium benzoate, potassium sorbate, sodium benzoate, sodium dehydroacetate, sodium propionate, sorbic acid, thimerosal, thymol, phenylmercuric compounds such as phenylmercuric borate, phenylmercuric nitrate and phenylmercuric acetate, formaldehyde, and formaldehyde generators such as the preservatives Germall II® and Germall 115®

(imidazolidinyl urea, available from Sutton Laboratories, Charthan, N.J.). Other suitable preservatives are disclosed in U.S. Pat. No. 6,579,469, the entire disclosure of which is hereby incorporated by reference. In embodiments, mixtures of two or more preservatives may also be used.

The heat dissipating agent may include liquids or solids that may be soluble or insoluble in the monomer. The liquids may be volatile and may evaporate during polymerization, thereby releasing heat from the composition. Suitable heat dissipating agents may be found in U.S. Pat. No. 6,010,714, the entire disclosure of which is incorporated herein.

The plasticizing agent imparts flexibility to the polymer that is formed from the monomer. The plasticizing agent preferably contains little or no moisture and should not significantly affect the stability or polymerization of the monomer. Examples of suitable plasticizers include acetyl tributyl citrate, dimethyl sebacate, triethyl phosphate, tri(2-ethylhexyl)phosphate, tri(p-cresyl) phosphate, glyceryl triacetate, glyceryl tributyrate, dibutyl sebacate, di-n-butyl sebacate, diethyl sebacate, dioctyl adipate, isopropyl myristate, butyl stearate, lauric acid, trioctyl trimellitate, dioctyl glutarate, polydimethylsiloxane, and mixtures thereof. Preferred plasticizers include di-n-butyl sebacate. In embodiments, suitable plasticizers include polymeric plasticizers, such as polyethylene glycol (PEG) esters and capped PEG esters or ethers, polyester glutarates and polyester adipates.

The viscosity of the polymerizable cyanoacrylate monomer or monomers and/or the monomer composition may be controlled by the addition of a viscosity modifying agent or component. The viscosity modifying agents may be selected from among known thickeners, including, but not limited to, poly(2-ethylhexyl methacrylate), poly(2-ethylhexyl acrylate) and cellulose acetate butyrate. Suitable thickeners further include, for example, polycyanoacrylates, polyoxalates, lactic-glycolic acid copolymers, polycaprolactone, lactic acid-caprolactone copolymers, poly(caprolactone+DL-lactide+glycolide), polyorthoesters, polyalkyl acrylates, copolymers of alkylacrylate and vinyl acetate, polyalkyl methacrylates, and copolymers of alkyl methacrylates and butadiene. Examples of alkyl methacrylates and acrylates are poly(butylmethacrylate) and poly(butylacrylate), also copolymers of various acrylate and methacrylate monomers, such as poly(butylmethacrylate-co-methylmethacrylate). Biodegradable polymer thickeners are preferred for some uses such as some surgical uses.

Preferably, the viscosity modifying agent is soluble in a monomer composition at room temperature (i.e., 20-25° C.) so that it may be added to the monomer composition without excessive heating of the monomer composition and remain uniformly combined in the composition.

The amount of viscosity modifying agent that is added to the monomer composition depends upon the molecular weight of the viscosity modifying agent. The viscosity modifying agent preferably comprises from about 0.5 to about 25.0% by weight of the adhesive composition. In preferred embodiments, the viscosity modifying agent comprises from about 1.0 to about 10.0%, more preferably about 1.0 to about 5.0%, of the adhesive composition. In embodiments, the viscosity modifying agent has a high molecular weight, preferably at least 100,000, or at least 500,000 or at least 1,000,000. The viscosity modifying agent is selected such that it is compatible with the monomer (i.e., does not adversely affect polymerization, bond strength, core properties, or shelf-life). The amount of viscosity modifying agent to be used can be determined by one of ordinary skill in the art using known techniques without undue experimentation.

In embodiments, the adhesive composition has a viscosity of about 20-10,000 centipoise, preferably 30-1,000 centipoise, and more preferably 150(since 200 is the bottom of our specification)-1,000 centipoise as measured with a Brookfield Viscometer at 25° C.

Suitable thixotropic agents may include, but are not limited to, silica gels such as those treated with a silyl isocyanate. Examples of suitable thixotropic agents are disclosed in, for example, U.S. Pat. No. 4,720,513, the disclosure of which is hereby incorporated in its entirety.

The composition may also optionally include at least one natural or synthetic rubber to impart impact resistance, which is preferable especially for industrial compositions of the present invention. Suitable rubbers are known to the skilled artisan. Such rubbers include, but are not limited to, dienes, styrenes, acrylonitriles, and mixtures thereof. Examples of suitable rubbers are disclosed in, for example, U.S. Pat. Nos. 4,313,865 and 4,560,723, the disclosures of which are hereby incorporated in their entireties.

Compositions of the present invention are believed to have little to no toxicity. Nevertheless, medical compositions of the present invention may also include at least one biocompatible agent effective to reduce active formaldehyde concentration levels produced during in vivo biodegradation of the polymer (also referred to herein as "formaldehyde concentration reducing agents"). Preferably, this component is a formaldehyde scavenger compound. Examples of formaldehyde scavenger compounds include sulfites; bisulfites; mixtures of sulfites and bisulfites; ammonium sulfite salts; amines; amides; imides; nitriles; carbamates; alcohols; mercaptans; proteins; mixtures of amines, amides, and proteins; active methylene compounds such as cyclic ketones and compounds having a α-dicarbonyl group; and heterocyclic ring compounds free of a carbonyl group and containing an NH group, with the ring made up of nitrogen or carbon atoms, the ring being unsaturated or, when fused to a phenyl group, being unsaturated or saturated, and the NH group being bonded to a carbon or a nitrogen atom, which atom is directly bonded by a double bond to another carbon or nitrogen atom. Other examples of formaldehyde level reducing compounds and compositions are disclosed in exemplary patents U.S. Pat. Nos. 6,010,714; 5,624,669; 5,582,834; and 5,575,997, the entire disclosures of which are hereby incorporated by reference.

To improve the cohesive strength of adhesives formed from the compositions of this invention, difunctional monomeric cross-linking agents may be added to the monomer compositions of this invention. Such crosslinking agents are known. Exemplary crosslinking agents are disclosed in U.S. Pat. No. 3,940,362, which is hereby incorporated by reference in its entirety. Examples of suitable crosslinking agents include, but are not limited to, alkyl bis(2-cyanoacrylates), triallyl isocyanurates, alkylene diacrylates, alkylene dimethacrylates, trimethylol propane triacrylate, and alkyl bis(2-cyanoacrylates).

To improve the adhesion between substrates (e.g. tissue surface) and the compositions of this invention, priming agents may be used to condition the substrate prior to applying in the cyanoacrylate monomer. Suitable primers include, but are not limited to, pH-modifying agents (e.g. organic or inorganic bases), ionic and non-ionic surfactants, and organic or inorganic salts. Other suitable priming agents can be readily identified by one skilled in the art in light of the present disclosure.

The compositions of this invention may further contain fibrous reinforcements and colorants such as dyes, pigments, and pigment dyes. Examples of suitable fibrous reinforcements include PGA microfibrils, collagen microfibrils, cellulosic microfibrils, and olefinic microfibrils. Examples of suitable colorants include 1-hydroxy-4-[4-methylphenylamino]-9,10 anthracenedione (D+C violet No. 2); disodium salt of 6-hydroxy-5-[(4-sulfophenyl)axo]-2-naphthalene-sulfonic acid (FD+ C Yellow No. 6); 9-(o-carboxyphen0yl)-6-hydroxy-2,4,5,7-tetraiodo-3H-xanthen-3-one, disodium salt, monohydrate (FD+ C Red No. 3); 2-(1,3-dihydro-3-oxo-5-sulfo-2H-indol-2-ylidene)-2,3-dihydro-3-oxo-1H-indole-5-sulfonic acid disodium salt (FD+C Blue No. 2); and [phthalocyaninato (2-)] copper.

The composition may also optionally include at least one biological or therapeutic agent. The variety of biological/therapeutic agents that can be used in conjunction with the adhesive composition of the invention is vast. In general, biological/therapeutic agents which may be administered with adhesive/sealant compositions of the invention include, but are not limited to, anti-infective agents, such as antibiotics, antimicrobial agents (e.g. Diiodomethyl-p-tolylsulfone, 2,4,4'-Trichloro-2'-Hydroxydiphenyl Ether or combination thereof), antiseptics, bacteriocins, bacteriostats, disinfectants, fungicides, antibacterial, and antiviral agents; analgesics and analgesic combinations; anti-inflammatory agents; naturally derived or genetically engineered proteins, polysaccharides, glycoproteins, or lipoproteins; oligonucleotides, antibodies, antigens, cholinergics, cystostatics heparin neutralizers, procoagulants and hemostatic agents, such as prothrombin, thrombin, fibrinogen, fibrin, fibronectin, heparinase, Factor X/Xa, Factor VII/VIIa, Factor IX/IXa, Factor XI/XIa, Factor XII/XIIa, tissue factor, batroxobin, ancrod, ecarin, von Willebrand Factor, collagen, elastin, albumin, gelatin, platelet surface glycoproteins, vasopressin, vasopressin analogs, epinephrine, selectin, procoagulant venom, plasminogen activator inhibitor, platelet activating agents and synthetic peptides having hemostatic activity.

The composition may be used in surgical procedures as an adjunct to primary wound closure devices, such as staples, sutures, tapes, meshes to seal potential leaks of gasses, liquids, or solids. The surgical adhesive/sealant may be applied to tissue as a part of a surgical procedure in various forms, for example: liquid, powder, film, sponge or foam, impregnated fabric, impregnated sponge or foam, and spray. The instant adhesive compositions are particularly advantageous in a surgical context because of their absorbable nature.

The adhesive composition may be applied in single or multiple applications. For example, the adhesive compositions may be applied in a first layer, and after the first layer is allowed to fully or partially polymerize, a subsequent layer may be added. Such a process may be conducted numerous times, depending on the size of the wound and the amount of adhesive applied in each application.

In embodiments, the adhesive composition may be applied by any means known to those of skill in the art. By way of example, any suitable applicator may be used to apply the adhesive composite composition to a substrate.

Initiators, as described herein, may start polymerization of the polymerizable monomer composition and accelerators, as described herein, may speed up polymerization. In these embodiments, maintaining the initiator and accelerator and the polymerizable monomer composition separately is preferred.

By way of example, where the polymerizable monomer or monomers are cyanoacrylate monomers, it is preferred that the cyanoacrylate monomer or monomers and the components associated with the cyanoacrylate monomer(s), such as inhibitors, plasticizers, preservatives and so on, as described, are kept separate from the initiator and accelerator until the time of use. By way of example, the polymerizable cyanoacrylate monomer or monomers and any additives such as plasticizer, inhibitor, preservative or other desired additive may form a polymerizable cyanoacrylate monomer composition which is kept separate or in a non-contacting relationship from the initiator and accelerator until the time of use. At or just prior to the time the adhesive composition is to be used, the separate polymerizable monomer composition and the initiator and accelerator are combined to form the adhesive composition.

Applicators which enable the separation of components until use and enable combination of two-component systems are well-known in the art. By way of example, the Applicator for CoSeal Sealant, distributed by Angiotech Pharmaceutical, may be used. In addition, the applicator disclosed in application Ser. No. 11/565,022, incorporated by reference herein, may also be used. By way of further example, a two-part syringe system may be used wherein the initiator and accelerator are in one part and the polymerizable monomer composition is in another part. The components may be pushed together, combining at the time of use to form the adhesive composition which is dispersed for the desired application. Such a syringe system, for example, may utilize a T-shape configuration. Other two component systems are shown, for example, in U.S. Pat. Nos. 5,814,022 and 5,935,437.

In embodiments, a system for treating living tissue is provided with a first reservoir containing a biocompatible polymerizable monomer composition, a second reservoir in non-contacting relationship with the first reservoir containing an initiator and accelerator, and an applicator. The initiator preferably comprises a suitable quaternary ammonium salt and the accelerator preferably comprises a suitable trihydroxy tertiary amine. In embodiments, the initiator is BAC and the accelerator is TIPA. In other embodiments, the initiator is BAC and the accelerator is E-17-5. The biocompatible polymerizable monomer composition preferably comprises one or more cyanoacrylate monomer. The applicator is capable of combining the biocompatible polymerizable monomer composition and the initiator and accelerator to form an adhesive composition and applying the adhesive composition to living tissue.

In embodiments, the initiator and accelerator may be placed in an applicator body in one container while the polymerizable cyanoacrylate monomer composition is stored in another container within the applicator body, so long as a non-contacting relationship between the polymerizable monomer composition and the initiator and accelerator is maintained until use of the adhesive composition.

The adhesive composition may be packaged in any type of suitable container fabricated from materials including, but not limited to, glass, plastic, metal packages, and film-formed packages. Suitable containers preferably include those into which the compositions may be dispensed and sterilized without unacceptable damage to, or degradation of, the container or the components of the monomer composition. As disclosed in U.S. Patent Publication No. 2003/0039781, the entire disclosure of which is hereby incorporated by reference, post-halogenated (e.g., fluourinated) or silanized polymeric barrier layers on at least the monomer-contacting surfaces of the container provide a superior shelf-life for monomer compositions. Glass is especially preferred when sterilization is achieved with dry heat because of the lack of stability of many plastics at temperatures used for dry heat sterilization (typically at least about 140° C.). Examples of types of containers include, but are not limited to, ampoules, vials, syringes, pipettes, and the like.

The adhesive compositions described herein have multiple medical applications. For example, as an internal surgical adhesive and sealant, the adhesive can bond tissue to tissue, tissue to medical device (e.g. meshes, clips and films), and medical device to medical device. As a sealant, the composition can be coated on a tissue, on a medical device, or on the interface between a medical device and tissue to prevent leaks. The composition can be used to form films in situ that may have applications such as for the prevention of surgical adhesions. The composition can be used to form foams in situ that may have applications such as a filler (e.g. dead space removal, reconstructive, and cosmetic surgeries), bulking agents, tissue engineering (e.g. scaffolds) materials, and others where foams and sponges are useful. The composition can be formulated so that it is injectable and used to form gels in situ that are localized, and adherent to tissue, thus staying at the site where they are injected. The injectable formulation may have applications such as a delivery matrix for cells and other biologicals, bioactive agents and pharmaceutical or neutraceutical agents, as embolization agents, and as means to localize contrasting agents.

As a filler, the adhesive composition may be used as a facial, defect or void filler. For example, the composition may be applied in the interstices of an internal void and allowed to polymerize therein, such that the resultant polymer fills the internal cavities and voids, penetrating and conforming to the interstices and pores of the tissue. Thus, the composition may be used after a broad number of procedures having potential risk of dead space formation, including, but not limited to, radical mastectomy (i.e. breast and regional lymph nodes removal for cancer treatment), breast reconstruction and augmentation procedure, reconstructive or cosmetic abdominoplasty and liposuction, face-lift, cesarean section and hysterectomy in obese patients, orthopedic procedures on thigh region, incisional hernia repair, lipoma excision, and traumatic lesions, i.e. closed trauma.

EXAMPLES

The present invention will be further understood by reference to the following non-limiting examples:

In the following examples two adhesive compositions (A and B) and a control adhesive composition (Control) were used to evaluate the initiator/accelerator system. Compositions A and B were formulated to a viscosity of 200 to 250 centipoise. The control composition was approximately 40 to 55 centipoise. Table 1 details the general formulation of each composition. 2OCA indicates stabilized 2-octyl cyanoacrylate.

TABLE 1

Compositions Used for Testing

| Composition ID | 2OCA | Thickener | Plasticizer | Solvent | Dye |
|---|---|---|---|---|---|
| A | 83.8 | 8.7 | 6.3 | 1.2 | 0.004 |
| B | 79.2 | 9.5 | 6.3 | 5.0 | 0.004 |
| Control | 80.9 | 4.3 | 4.9 | 10.0 | 0.003 |

Approximate Weight percent (wt %)

A glass ampoule filled with approximately 0.70 grams composition was prepared and sterilized via dry heat. The sterile ampoule was placed inside a flat-bottomed butyrate tube. The tube was sealed with a porous applicator tip. The porous applicator tip contained the initiator/accelerator system of interest. The initiator/accelerator system was applied using a 50/50 (volume) solution of acetone and methanol. The solvent was evaporated leaving the initiator/accelerator system deposited on the porous plug. The device may be sterilized using known methods such as ethylene oxide to render the final device sterile for application to living tissue.

In the following examples, the average exotherm is defined as the average of the maximum exotherms reached for a given set of data. The maximum exotherm is also reported for comparison.

Example 1

Polymerization was attempted using composition B and the trihydroxy tertiary amine triisopropanolamine (TIPA) only. Three concentrations of TIPA were evaluated: 65, 130, and 240 µg. The film did not set in a clinically acceptable timeframe. As a comparison, when using benzalkonium chloride (BAC) with the same composition, the film set in 118 seconds with an average exotherm of 50.1° C. and a maximum exotherm of 57.9° C. These devices were not terminally sterilized. Six units are tested.

Example 2

Polymerization was attempted using composition B and poly (5) oxyethylene isotridecyloxypropyl amine (E-17-5) only. Two concentrations of E-17-5 were evaluated: 107 and 215 µg. The film did not set in a clinically acceptable timeframe. As noted in Example 1, when using benzalkonium chloride (BAC) with the same composition, the film set in 118 seconds with an average exotherm of 50.1° C. and a maximum exotherm of 57.9° C. These devices were not terminally sterilized. Six units were tested.

Example 3

Figure 2:
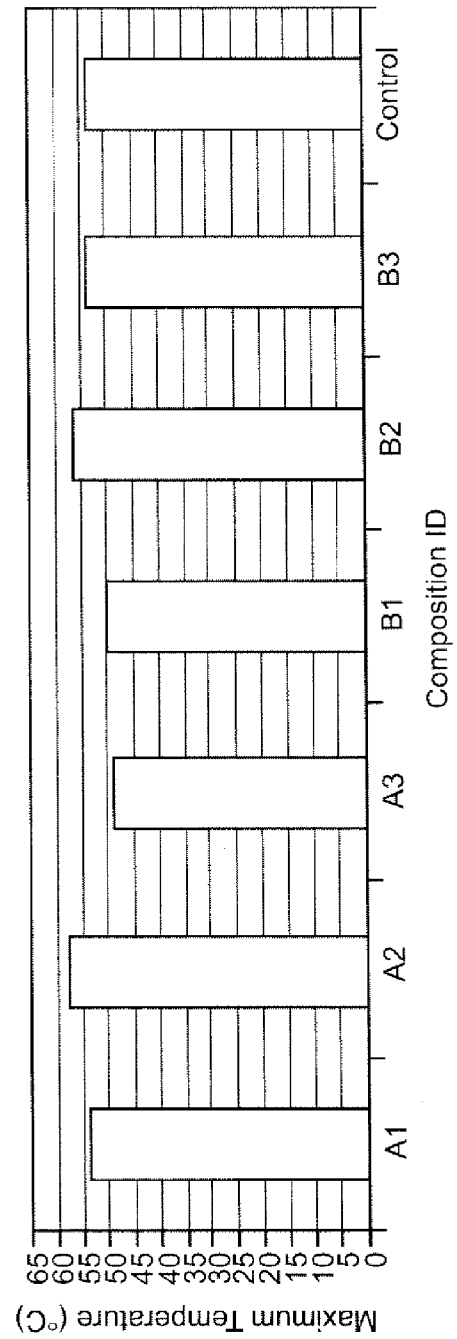
FIG. 2 is a chart depicting the Maximum Temperature for Benzalkonium Chloride System with Compositions A (3 Lots) and B (3 Lots): 110 µg compared to Control Composition with 40 µg Benzalkonium Chloride.

Compositions A and B were polymerized using benzalkonium chloride (BAC) only. Three lots of composition A were evaluated: A1, A2, and A3. Three lots of composition B were also evaluated: B1, B2, and B3. One concentration of BAC was evaluated: 110 µg. The control composition was initiated using 40 µg of BAC. These initiator levels allowed a film to form in a clinically acceptable timeframe for the compositions under evaluation. Devices were sterilized using ethylene oxide. Twelve devices were evaluated for average and maximum exotherm. FIG. 1 presents the average setting temperature. FIG. 2 presents the maximum setting temperature. In Table 2, the average and maximum exotherm are also reported as well as the decrease in both relative to the control composition.

TABLE 2

Average and Maximum Exotherm and Decrease Relative to Control Composition for BAC System: 110 µg

| Composition ID | Ave Temperature (° C.) | Maximum Temperature (° C.) | Average Temperature Decrease (° C.) | Maximum Temperature Decrease (° C.) |
|---|---|---|---|---|
| A1 | 46 | 53 | 4 | 0 |
| A2 | 49 | 57 | 1 | −4 |
| A3 | 41 | 49 | 9 | 4 |
| B1 | 40 | 50 | 10 | 3 |
| B2 | 43 | 56 | 7 | −3 |
| B3 | 47 | 54 | 3 | −1 |
| Control | 50 | 53 | NA | NA |

For Examples 4-10, all devices were sterilized using ethylene oxide. A combination initiator/accelerator system was evaluated. The combination system was compared to the control composition that was initiated with 40 µg BAC. All films polymerize in a clinically acceptable timeframe. A total of twelve devices were used for each determination. Devices were sterilized using ethylene oxide.

Example 4

Figure 3:
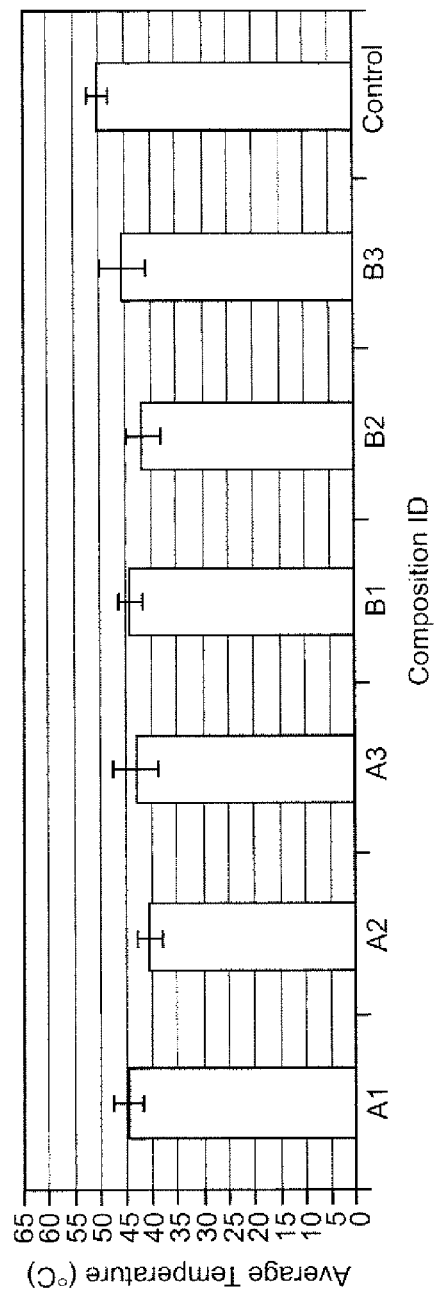
FIG. 3 is a chart depicting the Average Temperature for Benzalkonium Chloride/E-17-5 System with Compositions A (3 Lots) and B (3 Lots): 55 µg/903 µg compared to Control Composition with 40 µg Benzalkonium Chloride.
Figure 4:
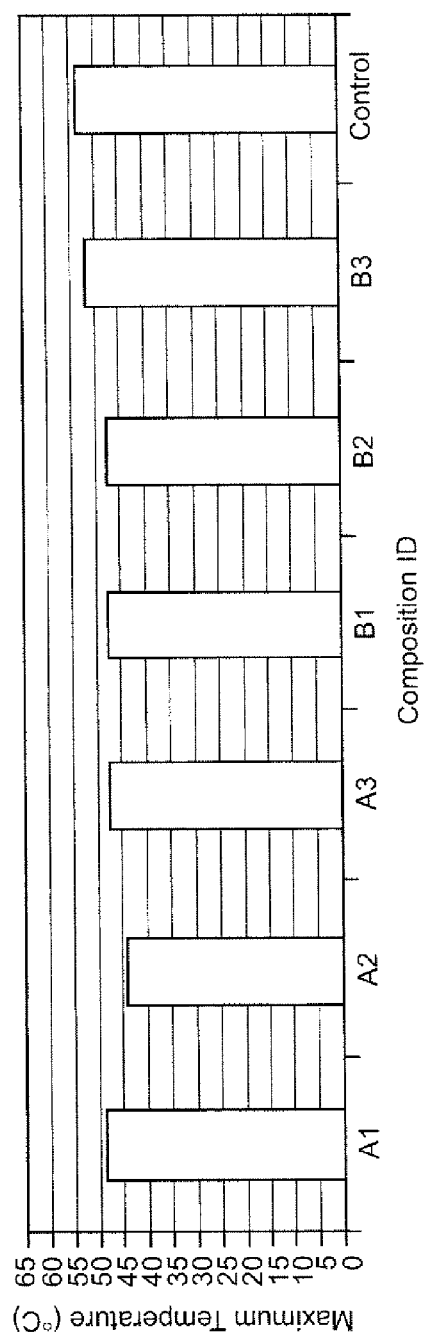
FIG. 4 is a chart depicting the Maximum Temperature for Benzalkonium Chloride/E-17-5 System with Compositions A (3 Lots) and B (3 Lots): 55 µg/903 µg compared to Control Composition with 40 µg Benzalkonium Chloride.

Compositions A and B were polymerized using a combination initiator/accelerator system consisting of benzalkonium chloride (BAC)/E-17-5. Three lots of composition A: A1, A2, and A3 and three lots of composition B: B1, B2, and B3 were evaluated using a combination of 55 µg/903 µg BAC/E-17-5. This composition was compared against the control composition with 40 µg BAC initiator applied. FIG. 3 presents the average setting temperature. FIG. 4 presents the maximum setting temperature. In Table 3, the average and maximum exotherm are also reported as well as the decrease in both relative to the control composition.

TABLE 3

Average and Maximum Exotherm and Decrease Relative to Control Composition for BAC/E-17-5 System: 55 µg/903 µg

| Composition ID | Ave Temperature (° C.) | Maximum Temperature (° C.) | Average Temperature Decrease (° C.) | Maximum Temperature Decrease (° C.) |
|---|---|---|---|---|
| A1 | 45 | 48 | 5 | 5 |
| A2 | 40 | 44 | 10 | 9 |
| A3 | 43 | 48 | 7 | 5 |
| B1 | 44 | 48 | 6 | 5 |
| B2 | 42 | 48 | 8 | 5 |
| B3 | 46 | 53 | 4 | 0 |
| Control | 50 | 53 | NA | NA |

Example 5

Figure 5:
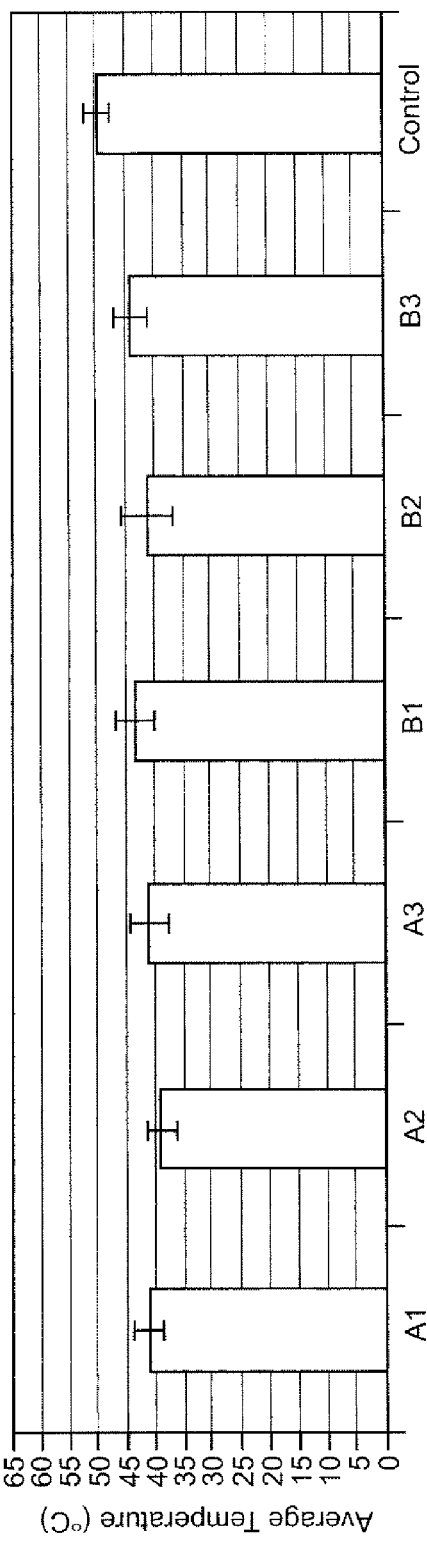
FIG. 5 is a chart depicting the Average Temperature for Benzalkonium Chloride/E-17-5 System with Compositions A (3 Lots) and B (3 Lots): 45 µg/803 µg compared to Control Composition with 40 µg Benzalkonium Chloride.
Figure 6:
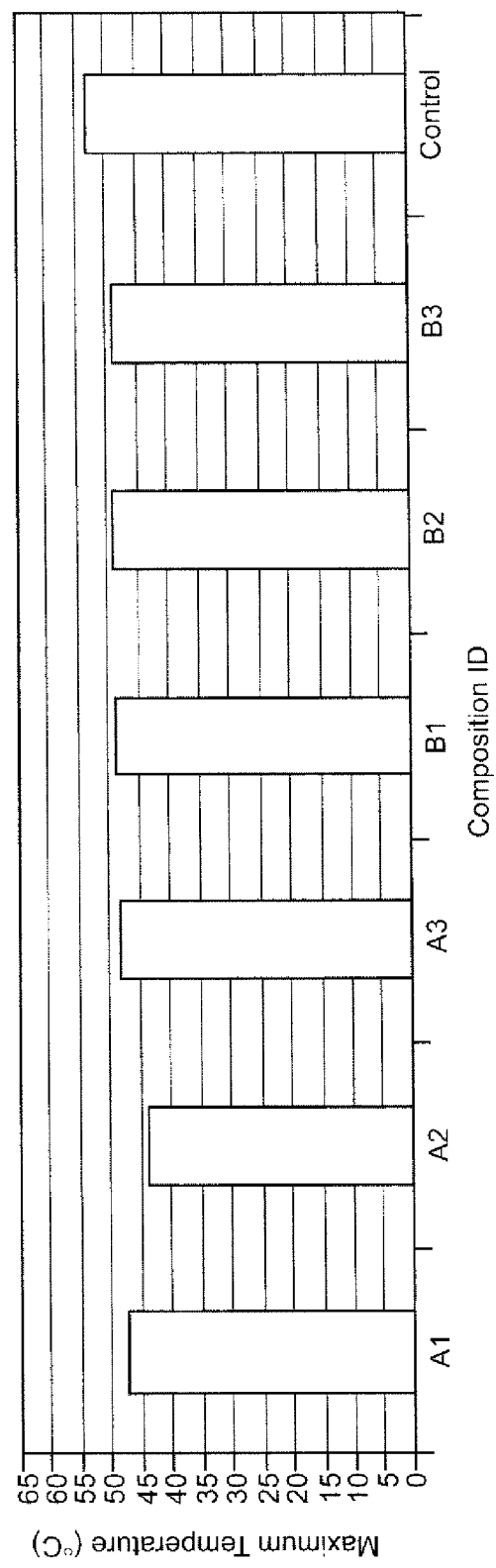
FIG. 6 is a chart depicting the Maximum Temperature for Benzalkonium Chloride/E-17-5 System with Compositions A (3 Lots) and B (3 Lots): 45 µg/803 µg compared to Control Composition with 40 µg Benzalkonium Chloride.

Compositions A and B were polymerized using a combination initiator/accelerator system consisting of benzalkonium chloride (BAC)/E-17-5. Three lots of composition A: A1, A2, and A3 and three lots of composition B: B1, B2, and B3 were evaluated using a combination of 45 µg/803 µg BAC/E-17-5. This composition was compared against the control composition with 40 µg BAC initiator applied. FIG. 5 presents the average setting temperature. FIG. 6 presents the maximum setting temperature. In Table 4, the average and maximum exotherm are also reported as well as the decrease in both relative to the control composition.

TABLE 4

Average and Maximum Exotherm and Decrease Relative to Control Composition for BAC/E-17-5 System: 45 µg/803 µg

| Composition ID | Ave Temperature (° C.) | Maximum Temperature (° C.) | Average Temperature Decrease (° C.) | Maximum Temperature Decrease (° C.) |
|---|---|---|---|---|
| A1 | 42 | 48 | 8 | 5 |
| A2 | 39 | 44 | 11 | 9 |
| A3 | 41 | 48 | 9 | 5 |
| B1 | 44 | 49 | 6 | 4 |
| B2 | 42 | 49 | 8 | 4 |
| B3 | 44 | 49 | 6 | 4 |
| Control | 50 | 53 | NA | NA |

Example 6

Figure 7:
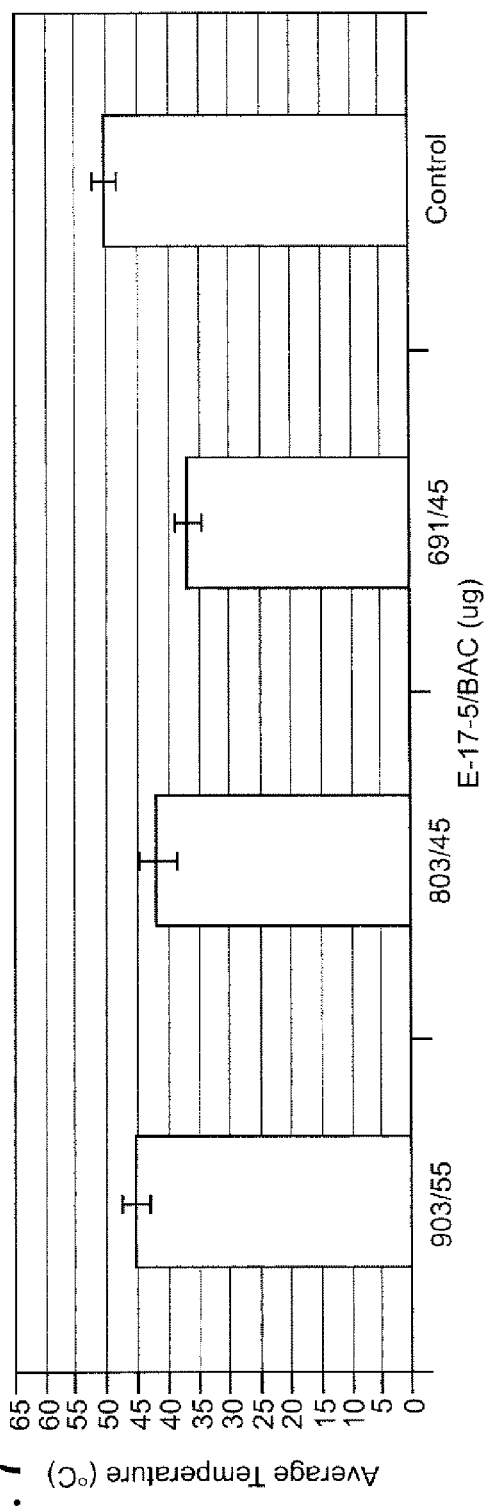
FIG. 7 is a chart depicting the Average Temperature for Benzalkonium Chloride/E-17-5 Systems with Composition A1 (Single Lot): 55 µg/903 µg, 45 µg/803 µg, and 45 µg/691 µg compared to Control Composition with 40 µg Benzalkonium Chloride.
Figure 8:
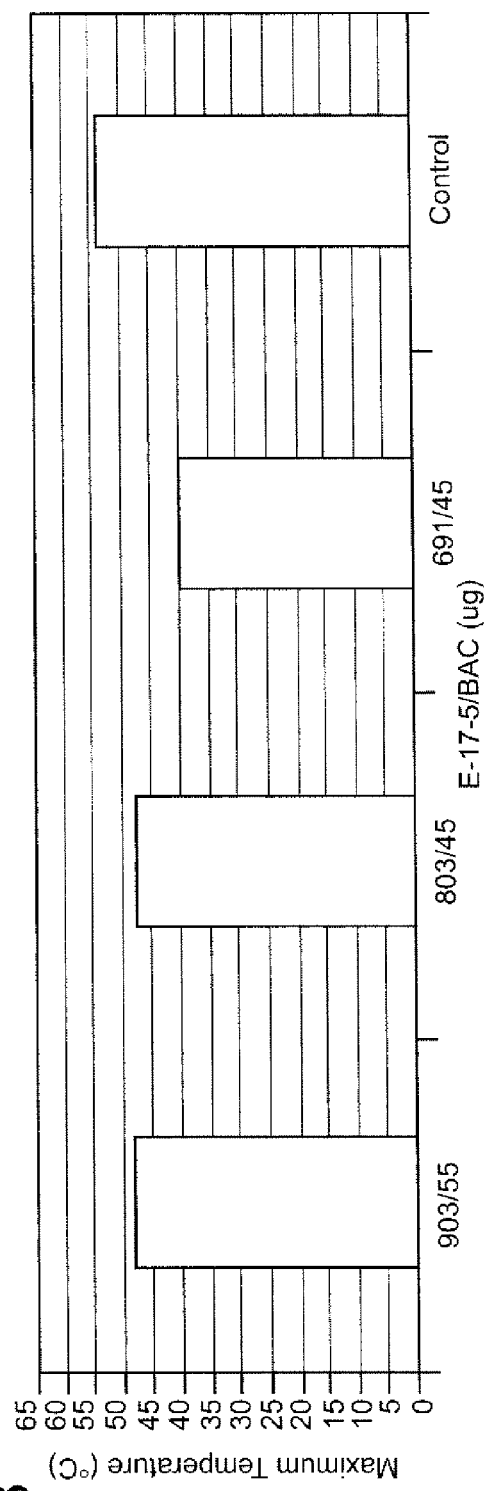
FIG. 8 is a chart depicting the Maximum Temperature for Benzalkonium Chloride/E-17-5 Systems with Composition A1 (Single Lot): 55 µg/903 µg, 45 µg/803 µg, and 45 µg/691 µg compared to Control Composition with 40 µg Benzalkonium Chloride.

Composition A, lot A1 was polymerized using a combination initiator/accelerator system consisting of benzalkonium chloride (BAC)/E-17-5. Three combinations of BAC/E-17-5 were evaluated with this lot: 55 µg/903 µg, 45 µg/803 µg, and 45 µg/691 µg. This composition was compared against the control composition with 40 µg BAC initiator applied. FIG. 7 presents the average setting temperature. FIG. 8 presents the maximum setting temperature. In Table 5, the average and maximum exotherm are also reported as well as the decrease in both relative to the control composition.

TABLE 5

Average and Maximum Exotherm and Decrease Relative to Control Composition for BAC/E-17-5 System and Composition A1: Multiple Ratios

| BAC/E-17-5 (µg/µg) | Ave Temperature (° C.) | Maximum Temperature (° C.) | Average Temperature Decrease (° C.) | Maximum Temperature Decrease (° C.) |
|---|---|---|---|---|
| 55/903 | 45 | 48 | 5 | 5 |
| 45/803 | 42 | 48 | 8 | 5 |
| 45/691 | 37 | 40 | 13 | 13 |
| Control | 50 | 53 | NA | NA |

Example 7

Figure 9:
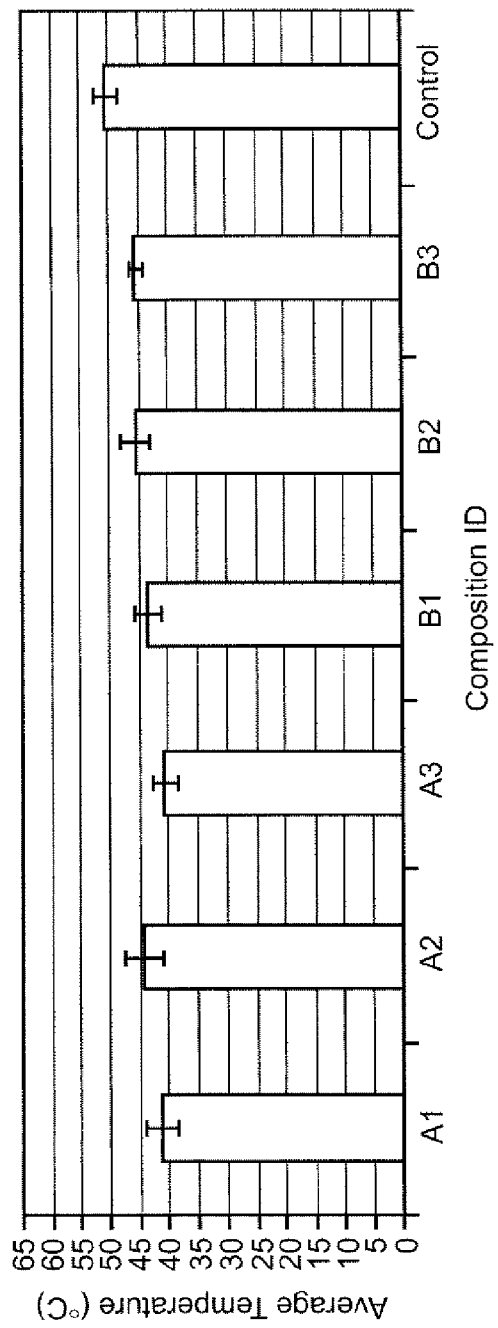
FIG. 9 is a chart depicting the Average Temperature for Benzalkonium Chloride/Triisopropanolamine (TIPA) System with Compositions A (3 Lots) and B (3 Lots): 55 µg/907 µg compared to Control Composition with 40 µg Benzalkonium Chloride.
Figure 10:
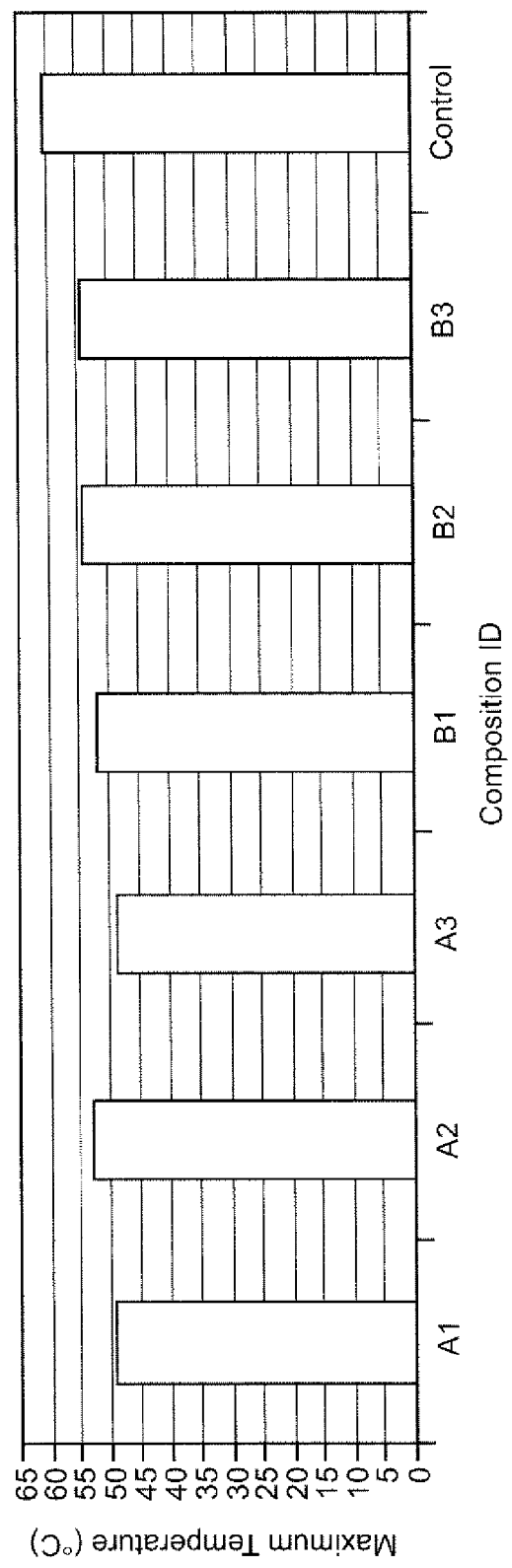
FIG. 10 is a chart depicting the Maximum Temperature for Benzalkonium Chloride/Triisopropanolamine (TIPA) System with Compositions A (3 Lots) and B (3 Lots): 55 µg/907 µg compared to Control Composition with 40 µg Benzalkonium Chloride.
Figure 11:
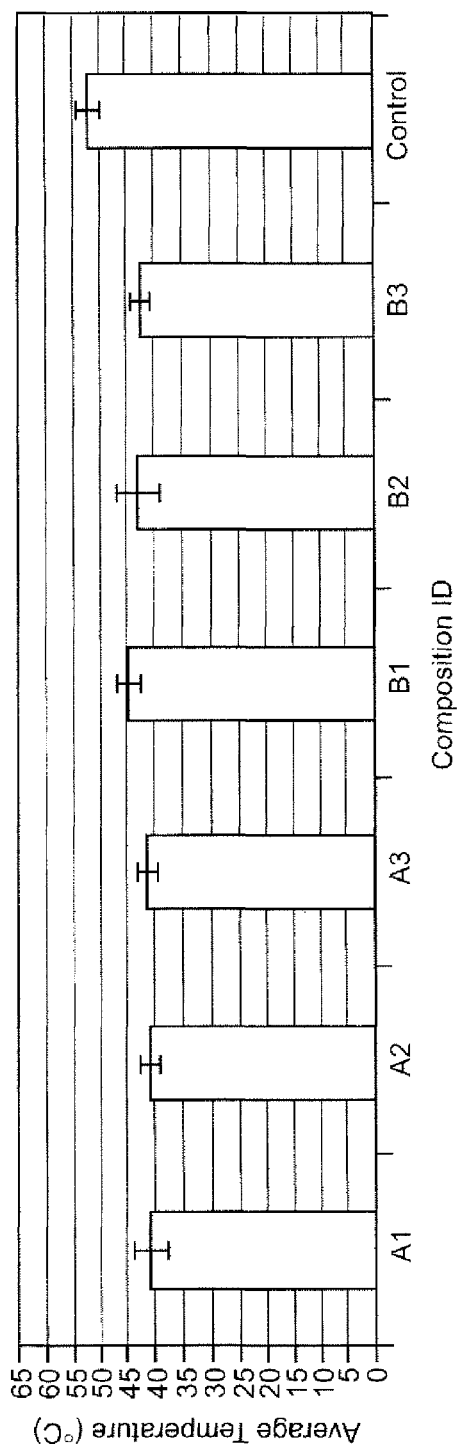
FIG. 11 is a chart depicting the Average Temperature for Benzalkonium Chloride/Triisopropanolamine (TIPA) System with Compositions A (3 Lots) and B (3 Lots): 45 µg/829 µg compared to Control Composition with 40 µg Benzalkonium Chloride.
Figure 12:
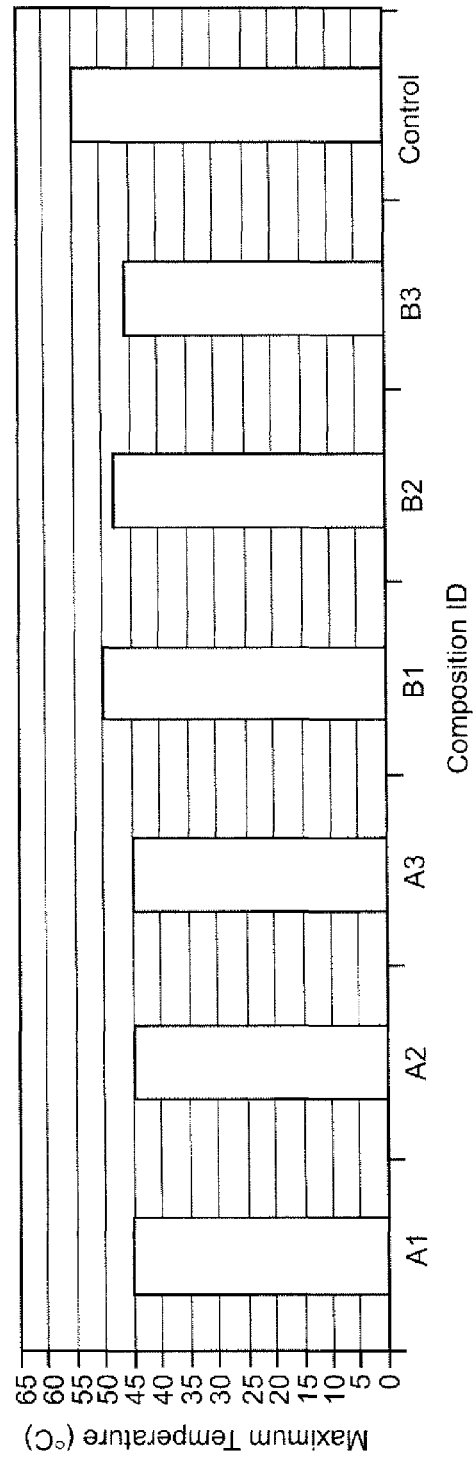
FIG. 12 is a chart depicting the Maximum Temperature for Benzalkonium Chloride/Triisopropanolamine (TIPA) System with Compositions A (3 Lots) and B (3 Lots): 45 µg/829 µg compared to Control Composition with 40 µg Benzalkonium Chloride.

Compositions A and B are polymerized using a combination initiator/accelerator system consisting of BAC/triisopropanolamine (TIPA). Three lots of composition A: A1, A2, and A3 and three lots of composition B: B1, B2, and B3 were evaluated using a combination of 55 µg/907 µg BAC/TIPA. This composition was compared against the control composition with 40 µg BAC initiator applied. FIG. 9 presents the average setting temperature. FIG. 10 presents the maximum setting temperature. In Table 6, the average and maximum exotherm are also reported as well as the decrease in both relative to the control composition.

TABLE 6

Average and Maximum Exotherm and Decrease Relative to Control Composition for BAC/TIPA System: 55 µg/907 µg

| Composition ID | Ave Temperature (° C.) | Maximum Temperature (° C.) | Average Temperature Decrease (° C.) | Maximum Temperature Decrease (° C.) |
|---|---|---|---|---|
| A1 | 41 | 46 | 9 | 7 |
| A2 | 44 | 50 | 6 | 3 |
| A3 | 41 | 46 | 9 | 7 |
| B1 | 43 | 46 | 7 | 7 |
| B2 | 45 | 49 | 5 | 4 |
| B3 | 45 | 48 | 5 | 5 |
| Control | 50 | 53 | NA | NA |

Example 8

Compositions A and B were polymerized using a combination initiator/accelerator system consisting of BAC/triisopropanolamine (TIPA). Three lots of composition A: A1, A2, and A3 and three lots of composition B: B1, B2, and B3 were evaluated using a combination of 45 µg/829 µg BAC/TIPA. This composition was compared against the control composition with 40 µg BAC initiator applied. FIG. 9 presents the average setting temperature. FIG. 10 presents the maximum setting temperature. In Table 6, the average and maximum exotherm are also reported as well as the decrease in both relative to the control composition.

TABLE 7

Average and Maximum Exotherm and Decrease Relative to Control Composition for BAC/TIPA System: 45 µg/829 µg

| Composition ID | Ave Temperature (° C.) | Maximum Temperature (° C.) | Average Temperature Decrease (° C.) | Maximum Temperature Decrease (° C.) |
|---|---|---|---|---|
| A1 | 41 | 45 | 9 | 8 |
| A2 | 40 | 44 | 10 | 9 |
| A3 | 41 | 44 | 9 | 9 |
| B1 | 44 | 49 | 6 | 4 |
| B2 | 42 | 47 | 8 | 6 |
| B3 | 41 | 44 | 9 | 9 |
| Control | 50 | 53 | NA | NA |

Example 9

Figure 13:
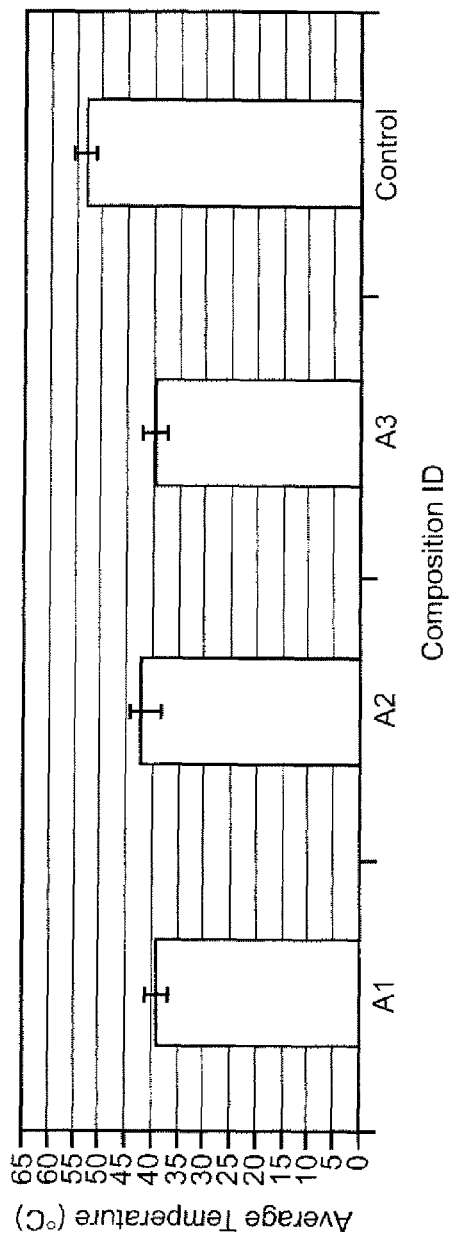
FIG. 13 is a chart depicting the Average Temperature for Benzalkonium Chloride/Triisopropanolamine (TIPA) System with Composition A (3 Lots): 45 µg/706 µg compared to Control Composition with 40 µg Benzalkonium Chloride.
Figure 14:
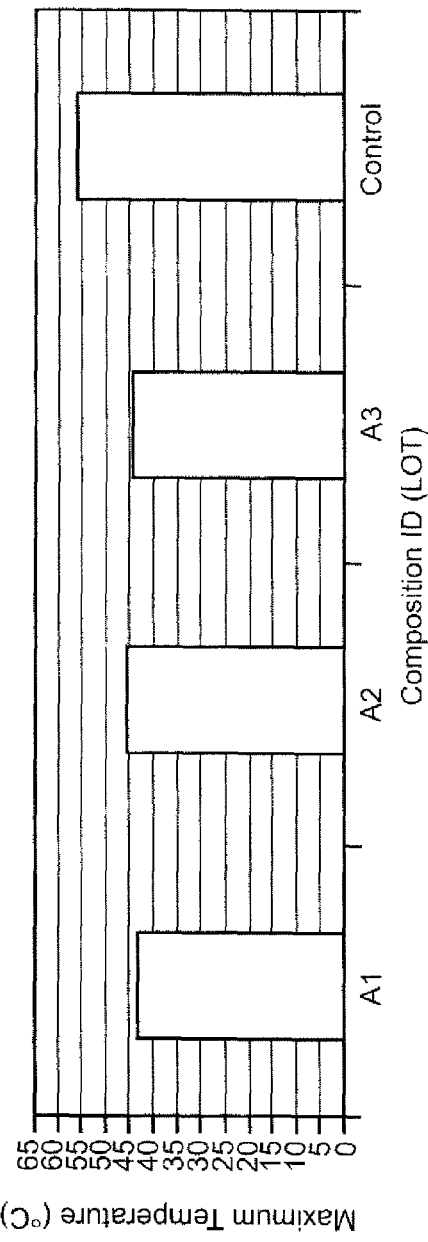
FIG. 14 is a chart depicting the Maximum Temperature for Benzalkonium Chloride/Triisopropanolamine (TIPA) System with Composition A (3 Lots): 45 µg/706 µg compared to Control Composition with 40 µg Benzalkonium Chloride.

Composition A was polymerized using a combination initiator/accelerator system consisting of BAC/triisopropanolamine (TIPA). Three lots of composition A: A1, A2, and A3 were evaluated using a combination of 45 µg/706 µg BAC/TIPA. This composition was compared against the control composition with 40 µg BAC initiator applied. FIG. 13 presents the average setting temperature. FIG. 14 presents the maximum setting temperature. In Table 8, the average and maximum exotherm are also reported as well as the decrease in both relative to the control composition.

TABLE 8

Average and Maximum Exotherm and Decrease Relative to Control Composition for BAC/TIPA System: 45 µg/706 µg and Composition A

| Composition ID | Ave Temperature (° C.) | Maximum Temperature (° C.) | Average Temperature Decrease (° C.) | Maximum Temperature Decrease (° C.) |
|---|---|---|---|---|
| A1 | 39 | 43 | 11 | 10 |
| A2 | 41 | 45 | 9 | 8 |
| A3 | 38 | 42 | 12 | 11 |
| Control | 50 | 53 | NA | NA |

Example 10

Figure 15:
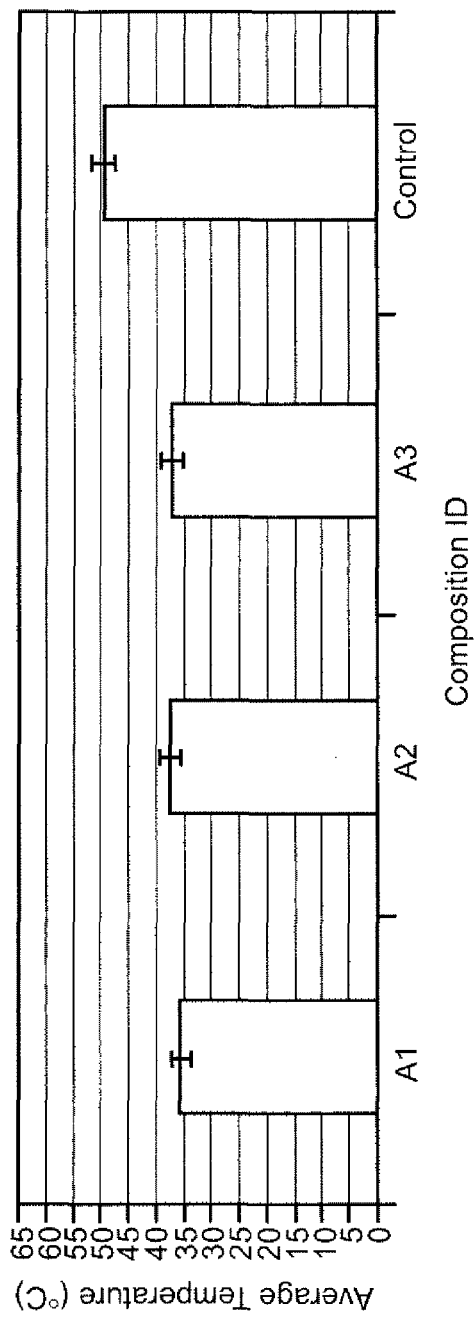
FIG. 15 is a chart depicting the Average Temperature for Benzalkonium Chloride/Triisopropanolamine (TIPA) System with Composition A (3 Lots): 35 µg/706 µg compared to Control Composition with 40 µg Benzalkonium Chloride.
Figure 16:
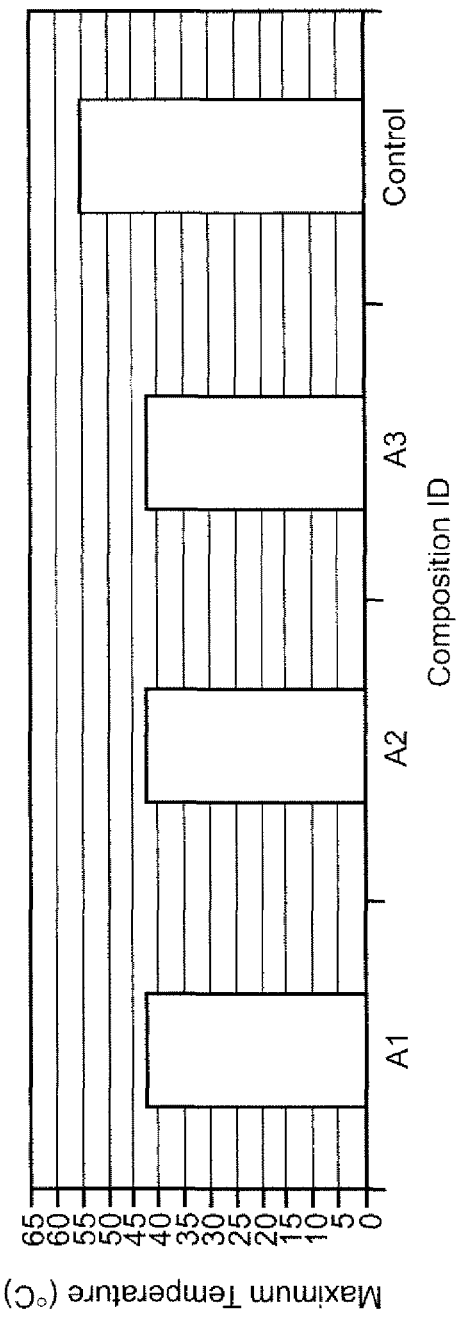
FIG. 16 is a chart depicting the Maximum Temperature for Benzalkonium Chloride/Triisopropanolamine (TIPA) System with Composition A (3 Lots): 35 µg/706 µg compared to Control Composition with 40 µg Benzalkonium Chloride.

Composition A was polymerized using a combination initiator/accelerator system consisting of BAC/triisopropanolamine (TIPA). Three lots of composition A: A1, A2, and A3 were evaluated using a combination of 35 µg/706 µg BAC/TIPA. This composition was compared against the control composition with 40 µg BAC initiator applied. FIG. 15 presents the average setting temperature. FIG. 16 presents the maximum setting temperature. In Table 9, the average and maximum exotherm are also reported as well as the decrease in both relative to the control composition.

TABLE 9

Average and Maximum Exotherm and Decrease Relative to Control Composition for BAC/TIPA System: 35 µg/706 µg and Composition A

| Composition ID | Ave Temperature (° C.) | Maximum Temperature (° C.) | Average Temperature Decrease (° C.) | Maximum Temperature Decrease (° C.) |
|---|---|---|---|---|
| A1 | 37 | 42 | 13 | 11 |
| A2 | 39 | 42 | 11 | 11 |
| A3 | 38 | 41 | 12 | 12 |
| Control | 50 | 53 | NA | NA |

Example 11

Figure 17:
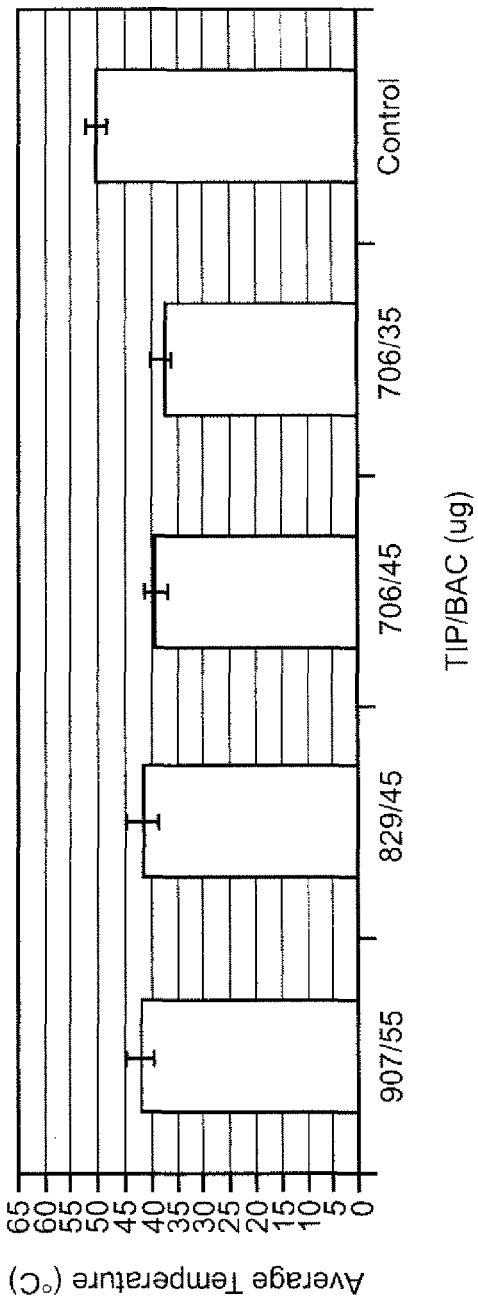
FIG. 17 is a chart depicting the Average Temperature for Benzalkonium Chloride/Triisopropanolamine Systems with Composition A1 (Single Lot): 55 µg/907 µg, 45 µg/829 µg, 45 µg/706 µg, and 35 µg/706 µg compared to Control Composition with 40 µg Benzalkonium Chloride.
Figure 18:
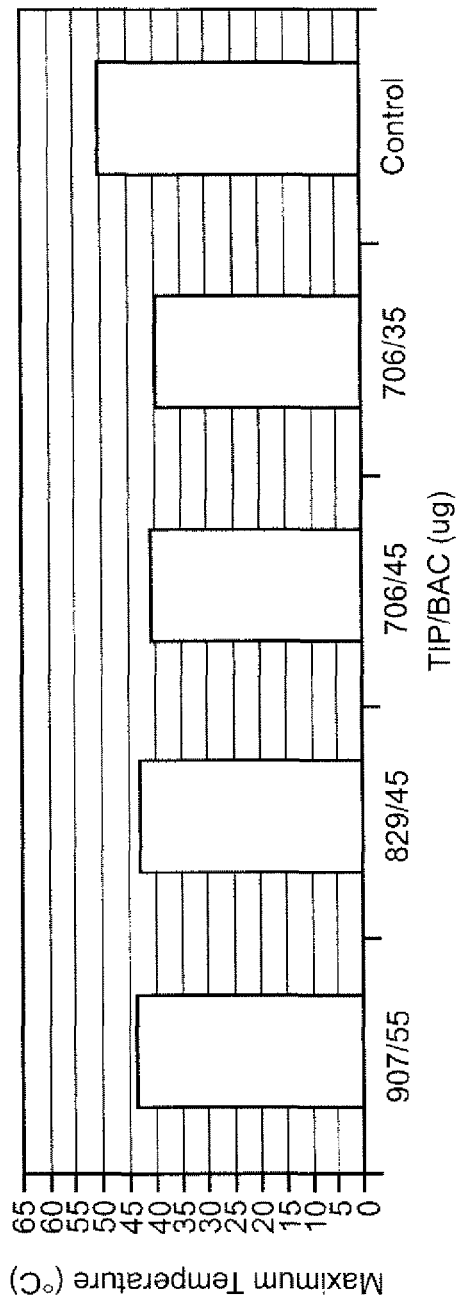
FIG. 18 is a chart depicting the Maximum Temperature for Benzalkonium Chloride/Triisopropanolamine Systems with Composition A1 (Single Lot): 55 µg/907 µg, 45 µg/829 µg, 45 µg/706 µg, and 35 µg/706 µg compared to Control Composition with 40 µg Benzalkonium Chloride.

Composition A, lot A1 was polymerized using a combination initiator/accelerator system consisting of BAC/triisopropanolamine (TIPA). Four combinations of BAC/TIPA were evaluated with this lot: 55 µg/907 µg, 45 µg/829 µg, 45 µg/706 µg, and 35 µg/706 µg. This composition was compared against the control composition with 40 µg BAC initiator applied. FIG. 17 presents the average setting temperature. FIG. 18 presents the maximum setting temperature. In Table 10, the average and maximum exotherm are also reported as well as the decrease in both relative to the control composition.

TABLE 10

Average and Maximum Exotherm and Decrease Relative to Control Composition for BAC/TIPA System and Composition A1: Multiple Ratios

| BAC/TIPA (µg/µg) | Ave Temperature (° C.) | Maximum Temperature (° C.) | Average Temperature Decrease (° C.) | Maximum Temperature Decrease (° C.) |
|---|---|---|---|---|
| 55/907 | 41 | 46 | 9 | 7 |
| 45/829 | 41 | 45 | 9 | 8 |
| 45/706 | 39 | 43 | 11 | 10 |
| 35/706 | 37 | 42 | 13 | 11 |
| Control | 50 | 53 | NA | NA |

Example 12

Composition A, lot A1 and Composition B, lot B1 were polymerized using a combination initiator/accelerator system consisting of BAC/triisopropanolamine (TIPA). Two combinations of BAC/TIPA were evaluated with this lot: 78 µg/1071 µg and 114 µg/1071 µg. A pen-style sterilized device was used for example 12. In Table 11, the average and maximum set times and average and maximum exotherm are reported.

TABLE 11

Average and Maximum Setting Time and Exotherm for BAC/TIPA System and Composition A1 and B1

| BAC/TIPA (µg/µg) | Com-position | Ave Time (seconds) | Maximum Time (seconds) | Ave Temperature (° C.) | Maximum Temperature (° C.) |
|---|---|---|---|---|---|
| 78/1071 | A1 | 95 | 121 | 48 | 52 |
| 78/1071 | B1 | 76 | 98 | 54 | 60 |
| 114/1071 | A1 | 88 | 115 | 49 | 53 |
| 114/1071 | B1 | 76 | 113 | 48 | 52 |

Example 13

Composition A, lot A1 and Composition B, lot B3 were polymerized using a combination initiator/accelerator system consisting of BAC/triisopropanolamine (TIPA). Two combinations of BAC/TIPA were evaluated with this lot: 79 μg/1089 μg and 117 μg/1088 μg. A swab-style sterilized device was used for example 13. In Table 12, the average and maximum set times and average and maximum exotherm are reported.

TABLE 12

Average and Maximum Setting Time and Exotherm for BAC/TIPA System and Composition A1 and B3

| BAC/TIPA (μg/μg) | Composition | Ave Time (seconds) | Maximum Time (seconds) | Ave Temperature (° C.) | Maximum Temperature (° C.) |
|---|---|---|---|---|---|
| 79/1089 | A1 | 93 | 113 | 48 | 52 |
| 79/1089 | B3 | 89 | 120 | 48 | 52 |
| 117/1088 | A1 | 83 | 103 | 51 | 54 |
| 117/1088 | B3 | 74 | 94 | 52 | 56 |

What is claimed is:

1. An adhesive composition comprising:
   one or more polymerizable cyanoacrylate monomers,
   a polymerization initiator for the one or more polymerizable cyanoacrylate monomers comprising a quaternary ammonium salt, and
   a polymerization accelerator for the one or more polymerizable cyanoacrylate monomers comprising a trihydroxy tertiary amine,
   wherein the trihydroxy tertiary amine comprises a compound according to formula C:

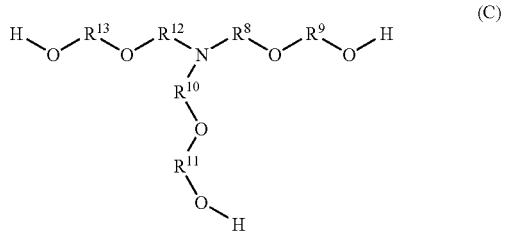

wherein $R^8$, $R^9$, $R^{10}$, $R^{11}$, $R^{12}$, $R^{13}$ are each, independently a C1-C20 alkylene, substituted alkylene, cyclic or substituted cycloalkylene, or aryl group.

2. The adhesive composition of claim 1, wherein the quaternary ammonium salt comprises a compound according to formula A:

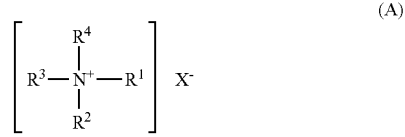

wherein $R^1$, $R^2$, $R^3$ and $R^4$ are each, independently, a substituted or unsubstituted straight, branched or cyclic alkyl group; a substituted or unsubstituted aromatic ring; or a substituted or unsubstituted aralkyl group, wherein the alkyl groups, aromatic rings or aralkyl groups may optionally further contain heteroatoms; and $X^-$ is an anion.

3. The adhesive composition of claim 1, wherein the quaternary ammonium salt is benzalkonium chloride.

4. An adhesive composition comprising:
   one or more polymerizable cyanoacrylate monomers,
   a polymerization initiator for the one or more polymerizable cyanoacrylate monomers comprising a quaternary ammonium salt, and
   a polymerization accelerator for the one or more polymerizable cyanocrylate monomers comprising a trihydroxy tertiary amine wherein the trihydroxy tertiary amine is poly (5) oxyethylene isotridecyloxypropyl amine .

5. A system for treating living tissue comprising:
   a first reservoir containing one or more polymerizable cyanoacrylate monomers,
   a second reservoir in a non-contacting relationship with the first reservoir containing a polymerization accelerator for the one or more polymerizable cyanoacrylate monomers comprising a trihydroxy tertiary amine, wherein the trihydroxy tertiary amine comprises a compound according to formula C:

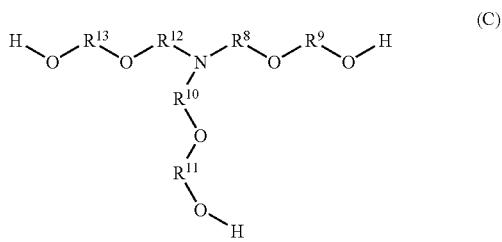

wherein $R^8$, $R^9$, $R^{10}$, $R^{11}$, $R^{12}$, $R^{13}$ are each, independently a C1-C20 alkylene, substituted alkylene, cyclic or substituted cycloalkylene, or aryl group and
an applicator capable of combining the polymerizable cyanoacrylate monomer and the polymerization accelerator to form an adhesive composition and then applying the adhesive composition to living tissue.

6. The system of claim 5, further comprising a polymerization initiator for the one or more polymerizable cyanoacrylate monomers comprising a quaternary ammonium salt, wherein the polymerization initiator is disposed in the second reservoir with the polymerization accelerator.

7. The system of claim 6, wherein the quaternary ammonium salt comprises a compound according to formula A:

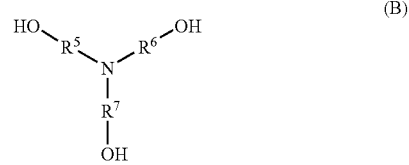

wherein $R^1$, $R^2$, $R^3$ and $R^4$ are each, independently, a substituted or unsubstituted straight, branched or cyclic alkyl group; a substituted or unsubstituted aromatic ring; or a substituted or unsubstituted aralkyl group, wherein the alkyl groups, aromatic rings or aralkyl groups may optionally further contain heteroatoms; and $X^-$ is an anion.

8. The system of claim 6, wherein the quaternary ammonium salt is benzalkonium chloride.

9. A system for treating living tissue comprising:
a first reservoir containing one or more polymerizable cyanoacrylate monomers,
a second reservoir in a non-contacting relationship with the first reservoir containing a polymerization accelerator for the one or more polymerizable cyanoacrylate monomers comprising a trihydroxy tertiary amine, wherein the trihydroxy tertiary amine is poly (5) oxyethylene isotridecyloxypropyl amine and
an applicator capable of combining the polymerizable cyanoacrylate monomer and the polymerization accelerator to form an adhesive composition and then applying the adhesive composition to living tissue.

10. A method of treating living tissue, comprising:
applying to living tissue a biocompatible adhesive composition comprising one or more polymerizable cyanoacrylate monomers, a polymerization initiator for the one or more polymerizable cyanoacrylate monomers comprising a quaternary ammonium salt, and a polymerization accelerator for the one or more polymerizable cyanoacrylate monomers comprising a trihydroxy tertiary amine, wherein the polymerization accelerator is poly (5) oxyethylene isotridecyloxypropyl amine.

* * * * *